(12) United States Patent
Jones et al.

(10) Patent No.: US 10,895,971 B2
(45) Date of Patent: Jan. 19, 2021

(54) METHODS, SYSTEMS, AND DEVICES FOR MAPPING, CONTROLLING, AND DISPLAYING DEVICE STATUS

(71) Applicant: iRobot Corporation, Bedford, MA (US)

(72) Inventors: Christopher V. Jones, Woburn, MA (US); Colin Angle, Beverly, MA (US)

(73) Assignee: iRobot Corporation, Bedford, MA (US)

( * ) Notice: Subject to any disclaimer, the term of this patent is extended or adjusted under 35 U.S.C. 154(b) by 177 days.

(21) Appl. No.: 15/594,222

(22) Filed: May 12, 2017

(65) Prior Publication Data

US 2018/0329617 A1 Nov. 15, 2018

(51) Int. Cl.
*G06F 3/048* (2013.01)
*G06F 3/0484* (2013.01)
*G06F 3/0481* (2013.01)
*G01C 21/20* (2006.01)
(Continued)

(52) U.S. Cl.
CPC ....... *G06F 3/04847* (2013.01); *G01C 21/206* (2013.01); *G05D 1/0246* (2013.01);
(Continued)

(58) Field of Classification Search
CPC .......... G06F 3/04847; G06F 3/04817; G06F 3/0482; H04W 4/70; H04W 84/12;
(Continued)

(56) References Cited

U.S. PATENT DOCUMENTS

| 10,120,354 | B1 * | 11/2018 | Rolston | H04L 12/2816 |
| 2012/0197464 | A1 * | 8/2012 | Wang | B25J 9/1689 701/2 |

(Continued)

FOREIGN PATENT DOCUMENTS

| CN | 110785969 A | 2/2020 |
| KR | 10-2004-0073324 | 8/2004 |
| WO | WO-2018208879 A1 | 11/2018 |

OTHER PUBLICATIONS

Notification of Transmittal of the International Search Report and the Written Opinion of the International Searching Authority, or the Declaration, in corresponding PCT Application No. PCT/US2018/031734 (14 pages) (dated Aug. 28, 2018).

(Continued)

*Primary Examiner* — Renee D Chavez
*Assistant Examiner* — Jianmei F Duckworth
(74) *Attorney, Agent, or Firm* — Schwegman Lundberg & Woessner, P.A.

(57) ABSTRACT

A method of operating a user terminal includes receiving occupancy data for an operating environment responsive to navigation of the operating environment by a mobile robot, and displaying a visual representation of the operating environment based on the occupancy data. The method further includes receiving information identifying a plurality of electronic devices that are local to the operating environment and respective operating states thereof, and populating the visual representation of the operating environment with visual indications of respective spatial locations of the electronic devices in the operating environment and status indications of the respective operating states of the electronic devices. Related methods for controlling the electronic devices based on their respective spatial locations and the relative spatial context of the operating environment are also discussed.

21 Claims, 15 Drawing Sheets

(51) Int. Cl.
*H04L 29/08* (2006.01)
*H04W 4/70* (2018.01)
*G05D 1/02* (2020.01)
*H04W 84/12* (2009.01)

(52) U.S. Cl.
CPC .......... *G06F 3/04817* (2013.01); *H04L 67/12* (2013.01); *H04W 4/70* (2018.02); *G05D 2201/0203* (2013.01); *G05D 2201/0207* (2013.01); *H04W 84/12* (2013.01)

(58) Field of Classification Search
CPC ........ G05D 1/0246; G05D 2201/0207; G05D 2201/0203; G01C 21/206; H04L 67/12; H05B 37/0218; H05B 37/0227
USPC ........................................................ 715/736
See application file for complete search history.

(56) References Cited

U.S. PATENT DOCUMENTS

| | | | |
|---|---|---|---|
| 2013/0056032 A1 | 3/2013 | Choe et al. | |
| 2014/0052293 A1* | 2/2014 | Bruemmer | G05D 1/0088 700/248 |
| 2014/0059435 A1 | 2/2014 | Kim et al. | |
| 2014/0207282 A1* | 7/2014 | Angle | H04L 12/282 700/257 |
| 2015/0100167 A1* | 4/2015 | Sloo | F24F 11/30 700/278 |
| 2016/0088438 A1* | 3/2016 | O'Keeffe | H04W 4/21 455/456.2 |
| 2016/0173293 A1 | 6/2016 | Kennedy | |
| 2017/0099353 A1 | 4/2017 | Arora et al. | |
| 2017/0225336 A1* | 8/2017 | Deyle | B25J 13/086 |
| 2018/0203448 A1* | 7/2018 | Kim | G05D 1/0238 |

OTHER PUBLICATIONS

"International Application Serial No. PCT/US2018/031734, International Preliminary Report on Patentability dated Nov. 21, 2019", 11 pgs.

"European Application Serial No. 18797977.8, Response Filed Jun. 19, 2020 to Communication pursuant to Rules 161(1) and 162 EPC dated Dec. 6, 2019", 16 pgs.

* cited by examiner

METHODS, SYSTEMS, AND DEVICES FOR MAPPING, CONTROLLING, AND DISPLAYING DEVICE STATUS

FIELD

The present disclosure relates to connected devices and systems and methods for interoperation of the same.

BACKGROUND

Connectivity (including wireless connection to the Internet and remote clients) has been contemplated for household appliances for some time. The term "Internet of Things" (IoT) has come to represent the idea that household articles of all kinds can be connected to the public Internet. Once connected, such articles can report various data to server and client devices. For example, 'smart' light bulbs may be connected to a household WLAN (Wireless Local Area Network). Each light bulb may have a microprocessor, memory, some means of detecting or interpreting status, power, and a wireless connection. Using these components, the light bulb can report its status, can be polled, etc.

The concept of IoT may be considered distinct from household connectivity in general (for example, connected computers, cable boxes, media devices, and the like) in that the IoT devices may not typically include sufficient computing resources or communications to meaningfully connect to the public internet. A conventional refrigerator would not connect to the internet; the same device as an IoT device would include computational, sensor, and communications hardware and sufficient software to become an entity addressable remotely and locally; the expectation being that this Internet Fridge could report its various states (power consumption or the like) and respond to remote commands (increase or decrease internal temperature).

Household mobile robots may also become IoT devices. In some ways, household mobile robots may be considered a distinct species within this set. In particular, the autonomy of the household mobile robot may set it apart from other appliances, which do not perform in unpredictable and variable environment conditions or make autonomous decisions based on tens or hundreds of sensor inputs in order to achieve mission completion. For example, a dishwasher—even an IoT dishwasher—does not know anything about its contents and runs the equivalent of simple scripts controlling motors and pumps, potentially interrupted by simple clog or other sensors. In contrast, a vacuuming robot may detect its own state in numerous ways during the course of its mission, and may flexibly escape from challenging situations in the household, as well as engage in predictive and planning activities. As such, there may be challenges in integrating the autonomous behavior of a household mobile robot with IoT device functionality.

SUMMARY

According to some embodiments of the present disclosure, a method of operating a user terminal includes receiving occupancy data for an operating environment responsive to navigation of the operating environment by a mobile robot, and displaying a visual representation of the operating environment based on the occupancy data. The method further includes receiving information identifying a plurality of electronic devices that are local to the operating environment and respective operating states thereof, and populating the visual representation of the operating environment with visual indications of respective spatial locations of the electronic devices in the operating environment and status indications of the respective operating states of the electronic devices. The method may be performed by or responsive to instructions from at least one processor of the user terminal.

In some embodiments, the method may further include receiving an input specifying a time via the user interface, and the respective operating states that are displayed in the visual representation may be associated with temporal data corresponding to the time specified by the input. The specified time may be a minute, an hour, a day, a week, etc.

In some embodiments, the method may further include displaying a user interface element that visually represents a temporal range via the user interface, and the input specifying the time may be received responsive to manipulation of the user interface element. The temporal range may include past, present, and future times, and may be likewise specified responsive to a user input.

In some embodiments, the user interface element may be a bar element representing the temporal range and a slider element that is displayed at respective positions along the bar element responsive to the manipulation.

In some embodiments, the temporal data may include past, present or future temporal data. The respective operating states that are displayed in the visual representation may be actual operating states associated with the past or present temporal data, or may be expected operating states associated with the future temporal data.

In some embodiments, the status indications may identify conflicts between the expected operating states of two or more of the electronic devices, based on the respective spatial locations thereof.

In some embodiments, the input specifying the time may be a temporal range, and a representation of the actual and/or expected operating states of one or more of the electronic devices over the temporal range specified by the user input may be displayed via the user interface.

In some embodiments, the information identifying the plurality of electronic devices may be localization data detected by one or more localizing sensors of the mobile robot, wireless communication signal coverage data acquired by one or more wireless receivers of the mobile robot, network data detected by one or more network elements, and/or user selection data received via the user interface of the user terminal.

In some embodiments, one or more of the electronic devices may be a non-connected device that lacks a network interface.

In some embodiments, populating the visual representation of the operating environment may include determining the respective spatial locations of the electronic devices in the operating environment. The respective spatial locations of the electronic devices may be determined based on localization data detected by at least one localization sensor of the mobile robot and/or wireless communication signals acquired by at least one wireless receiver of the mobile robot responsive to navigation thereof in the operating environment.

In some embodiments, populating the visual representation of the operating environment may include receiving respective inputs specifying the respective spatial locations of the electronic devices via the user interface, responsive to displaying the visual representation of the operating environment.

In some embodiments, conditional instructions to control operation of one or more of the electronic devices may be automatically generated based on the respective spatial locations thereof. For example, the one or more of the electronic devices may be lighting devices, and the conditional instructions may specify activation of the lighting devices based on a proximity of the respective spatial locations thereof to a natural light source in the operating environment and an expected or detected amount of light provided by the natural light source. As another example, the one or more of the electronic devices may be a motion-based alarm sensor, and the conditional instructions may specify deactivation of the motion-based alarm sensor based on a scheduled time of operation of a mobile robot at the respective spatial location of the motion-based alarm sensor.

In some embodiments, the visual indications may be respective icons representing the electronic devices, and the status indications may be graphical characteristics of the respective icons.

According to some embodiments of the present disclosure, a user terminal includes at least one receiver, a user interface, a processor coupled to the at least one receiver and the user interface, and a memory coupled to the processor. The memory includes a non-transitory computer-readable storage medium storing computer-readable program code therein that is executable by the processor to perform operations. The operations include receiving, via the at least one receiver, occupancy data for an operating environment responsive to navigation of the operating environment by a mobile robot, and displaying, via the user interface, a visual representation of the operating environment based on the occupancy data. The operations further include receiving, via the at least one receiver, information identifying a plurality of electronic devices that are local to the operating environment and respective operating states thereof, and populating the visual representation of the operating environment with visual indications of respective spatial locations of the electronic devices in the operating environment and status indications of the respective operating states of the electronic devices.

According to some embodiments of the present disclosure, a method of operating a computing device includes receiving occupancy data for an operating environment responsive to navigation thereof by a mobile robot, and associating electronic devices that are local to the operating environment with respective spatial locations in the operating environment based on the occupancy data. The method further includes transmitting a control signal to one or more of the electronic devices to control operation thereof based on the respective spatial locations associated therewith. The method may be performed by or responsive to instructions from at least one processor of the computing device.

In some embodiments, the occupancy data may be indicative of rooms in the operating environment, and the associating may further include identifying a relative spatial context of the rooms in the operating environment based on the occupancy data. The transmitting of the control signal to the one or more of the electronic devices may further be based on the relative spatial context of the rooms that correspond to the respective spatial locations associated therewith.

In some embodiments, the associating may further include grouping the electronic devices into respective subsets based on the respective spatial locations associated therewith corresponding to a same one of the rooms and/or contiguous ones of the rooms. The transmitting of the control signal to the one or more of the electronic devices may be based on the grouping thereof.

In some embodiments, the transmitting of the control signal to the one or more of the electronic devices may further be based on respective types of the rooms that correspond to the respective spatial locations associated therewith.

In some embodiments, the method further includes receiving, via at least one receiver of the computing device, data indicating operation of at least one other of the electronic devices. The respective spatial location of the at least one other of the electronic devices may be adjacent the respective spatial locations of the one or more of the electronic devices, and the transmitting of the control signal to the one or more of the electronic devices may further be based on the operation of the at least one other of the electronic devices.

In some embodiments, the at least one other of the electronic devices may be a motion sensor in one of the rooms adjacent to the respective spatial locations of the one or more of the electronic devices in the relative spatial context. The method may further include predicting a presence of a user in one of the rooms corresponding to the respective spatial locations of the one or more electronic devices responsive to the operation of the motion sensor in the one of the rooms adjacent thereto in the relative spatial context, and the transmitting of the control signal may be responsive to the predicting.

In some embodiments, the at least one other of the electronic devices may be an environmental sensor in one of the rooms adjacent to the respective spatial locations of the one or more of the electronic devices in the relative spatial context. The method may further include determining an environmental condition in the one of the rooms responsive to the operation of the environmental sensor, and the transmitting of the control signal to the one or more of the electronic devices may be based on the environmental condition in the one of the rooms adjacent to the respective spatial locations thereof.

In some embodiments, method may further include automatically generating conditional instructions to control the operation of the one or more of the electronic devices responsive to the associating of the electronic devices with the respective spatial locations, and the transmitting of the control signal to the one or more of the electronic devices may further be based on occurrence of one or more conditions specified by the conditional instructions.

In some embodiments, method may further include receiving, via at least one receiver of the computing device, data indicating respective operating states of the electronic devices and temporal data associated therewith. The temporal data may include past, present or future temporal data, and the respective operating states may be actual operating states associated with the past or present temporal data or expected operating states associated with the future temporal data. The respective operating states of the electronic devices and the temporal data associated therewith may be stored in a database.

According to some embodiments of the present disclosure, a computing device includes at least one transmitter, a processor coupled to the at least one transmitter, and a memory coupled to the processor. The memory includes a non-transitory computer-readable storage medium storing computer-readable program code therein that is executable by the processor to perform operations including receiving occupancy data for an operating environment responsive to navigation thereof by a mobile robot, and associating electronic devices that are local to the operating environment with respective spatial locations in the operating environment based on the occupancy data. The operations further include transmitting, via the at least one transmitter, a control signal to one or more of the electronic devices to control operation thereof based on the respective spatial locations associated therewith.

In some embodiments, the computing device may be the mobile robot or a component thereof, and the occupancy data may be detected by at least one localization sensor of the mobile robot.

Further features, advantages and details of the present disclosure, including any and all combinations of the above embodiments, will be appreciated by those of ordinary skill in the art from a reading of the figures and the detailed description of the embodiments that follow, such description being merely illustrative of the present disclosure.

DETAILED DESCRIPTION OF EMBODIMENTS

Figure 1A:
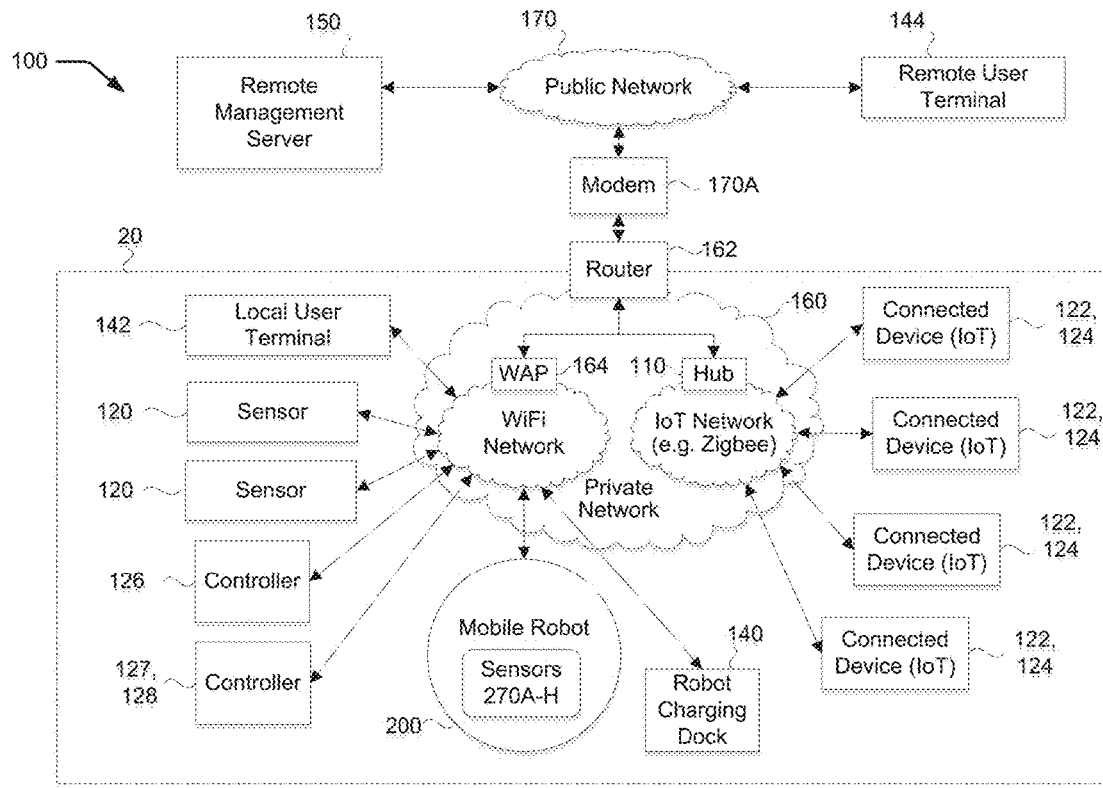
FIG. 1A is a schematic diagram representing a system according to embodiments of the present disclosure.

Embodiments of the present disclosure may arise from realization that the autonomous functionality of a mobile robot may present unique advantages for integration with IoT and/or other local device functionality based on its independent localization capabilities. In particular, the occupancy data collected by a mobile robot while navigating an operating environment (for example, in performing a cleaning mission or a patrolling mission in a household operating environment) may be used to visually indicate respective spatial locations and operating states of other electronic devices in the relative spatial context of the operating environment. The electronic devices may include network-connected and non-connected devices, and may be produced by different manufacturers and/or operate according to different standards, including different communication protocols. The visual representation of the operating environment may be a floorplan map that is populated with icons indicating respective locations and operating states of the electronic devices, thereby providing a "whole-home" snapshot of device location and operation. Historical and scheduled operating state information for the electronic devices may also be stored and presented in response to a user request to allow viewing of actual past or present operating states and/or expected future operating states. An understanding of device spatial location and operating status as provided by embodiments of the present disclosure may further allow for control of connected electronic devices based on their respective spatial locations, the relative spatial context of the areas of the operating environment in which they are located, and/or operating conditions in adjacent areas of the operating environment.

A mobile robot may refer to any device including a processor, memory, and drive system for navigating variable environment conditions and making autonomous decisions based on a plurality of sensor inputs. Mobile robots as described herein may include robot cleaners as well as autonomous patrolling robots. Some such autonomous patrolling robots may include a telescoping mast having one or more sensor elements mounted thereon or otherwise operably associated therewith.

A network-enabled electronic device (also referred to as a "connected device" may refer to any device including or coupled to a network interface for transmitting and/or receiving wired or wireless communication signals via a wired or wireless personal, local, and/or wide area network. Such connected devices may include, but are not limited to, network controllers, sensors, terminals, and/or IoT devices. Other examples of such connected devices may include, but are not limited to, lights/light bulbs, door/window sensors, door locks, speakers, thermostat, environmental sensors (temperature, humidity, air quality, illumination level), window blinds, voice interface devices, monitoring cameras, etc., having an integrated or other connection to a network interface. The wireless communication signals may include radio frequency signals, including but not limited to Wi-Fi signals, Bluetooth signals, ZigBee signals, and/or Z-wave signals, and/or optical signals. Such electronic devices may or may not include sufficient computing resources or communications to meaningfully connect to the public internet. Other electronic devices described with reference to the operating environments described herein may lack a network interface, and may be referred to as "non-connected devices."

With reference to FIGS. 1A, 1B, and 2-4A, a system 100 according to embodiments of the present disclosure is installed in an associated living structure 10. The structure 10 may be a home or residential dwelling, including but not limited to a single-family home, a multi-family dwelling (for example, a unit of a duplex, apartment, condominium, etc.), a mobile home, or a commercial living space (for example, an office or studio). The structure 10 may define a living space or interior space 20, also referred to herein as an operating environment. The living space 20 may be subdivided (physically, spatially and/or functionally) into one or more defined zones (illustrated as zones A-C). In some embodiments, the zones may correspond to areas of rooms in the living structure 10, such as Zone A being a Kitchen, Zone B being a Living Room and Zone C being a Bedroom. The defined zones A-C may be divided by walls or, as illustrated, may be open concept areas that have multiple, adjacent rooms that represent one broader contiguous living space, without wall division. The structure 10 has windows 30 (having blinds 30A coupled to controller 126), a door 32, light fixtures 34 and exhaustible lamps 34A (coupled to controller 128), a TV 36 (or other electronic equipment), and a heating, ventilation and air conditioning system (HVAC) 40 (coupled to controller 127). A user P may occupy the living space 20.

Figure 1B:
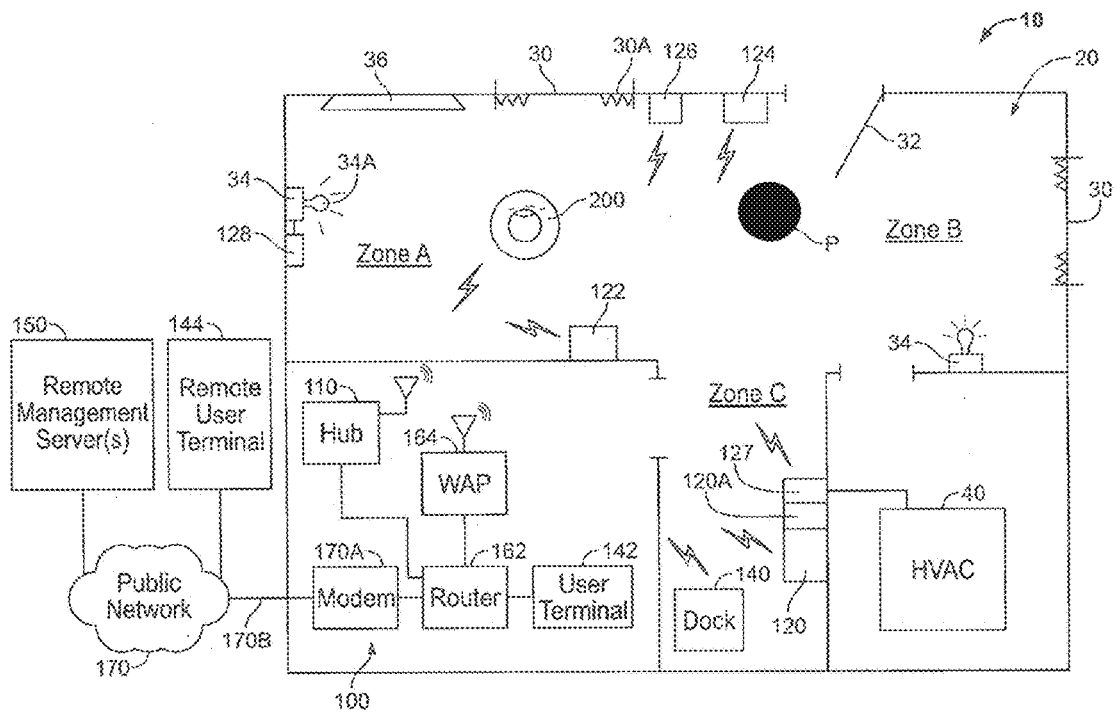
FIG. 1B is a schematic diagram illustrating an operating environment including the system of FIG. 1A installed therein according to embodiments of the present disclosure.

With reference to FIGS. 1A and 1B, the system 100 includes nodes including a network-enabled mobile robot 200, one or more wireless access points (WAP) 164, gateways and/or hubs 110 that interconnect different networking methods to make a local area private network 160, which interconnects network-enabled or "connected" electronic devices (including IoT devices) 120, 122, 124, network-enabled automation controller devices 126, 127, 128, a robot dock 140 that may also be a network-enabled automation controller device, and products that may combine multiple such functions. The private network 160 may include one or more wireless access points (WAP) 164, gateways, or hubs 110 that have a combined wireless range to adequately cover at or around all or most of the living space 20 bounded by the living structure 10. In some embodiments, one or more of the network nodes 110, 126, 127, 128, 200, 140, 142, 144, and 150 may define a connected computing device (such as the computing device 300 of FIG. 3) that is configured to control operations of one or more other connected electronic devices 30A, 34/34A, 36, 40, 120, 122, 124, 126, 127, 128, 200, 140, 142, 144, and/or electronic devices connected thereto based on their respective spatial locations in the operating environment 20.

Networked devices connected to the private network 160 can communicate with a remote management service 150 through a router/firewall 162 to reach a public network 170, through a WAN interface 170A and its associated WAN connection 170B. For example, the remote management service 150 may be a cloud computing device, the public network 170 may be the Internet, the WAN interface 170A may be a DSL, DOCSIS or Cellular modem, and its associated WAN connection 170B may be provided by an Internet Service Provider (ISP). The router 162, the WAP 164 and/or the modem 170A may be integrated into a single device, in various configurations. A local user terminal 142 may be connected (wired or wirelessly) to the private network 160. A remote user terminal 144 may be connected to the remote server 150 and/or the private network 160 via the public network 170. For example, the user terminals 142, 144 may be a PC, smartphone, or tablet computer. The hub 110, the robot 200, the controllers 126, 127, 128, and the user terminals 142, 144 may each be accessed either through a common network service embodied in a target device (for example, a web server which presents a UI over the local network through a web browser on the client device) or via a specialized client (for example, a downloadable or pre-installed application software app) enabling communications and control between the nodes 110, 126, 127, 128, 200, 140, 142, 144, and 150 as described herein. A network entity as discussed herein is a machine and/or controller that registers on a network, is assigned a unique address for sending and receiving communication signals, and may be available to other network entity machines and/or controllers on the same network or a connected network.

In some embodiments, the "same network" may refer to a set of private addresses on a private IP (Internet Protocol) subnet behind a routing network entity 162 that provides Network Address Translation (NAT) between the public internet and the private network. Each network entity connected to the private network can deduce the network addresses of other active network entities either by observing their network communications, and/or scanning the possible IP subnet of the private network, looking for responses. Some gateways/hubs provide a network service that can enumerate what devices are associated with, and/or reachable through, that gateway/hub. These techniques yield one or both the IP address of each active device and/or their MAC (media access control) address. The Address Resolution Protocol (ARP) network service can map one type of address into the other. In some embodiments, a routine running on the processor of a network entity (such as the mobile robot 200) can collect the network address of other network entities (such as connected devices 120, 122, 124, 126, 127, 128) and identify a type, manufacturer, and/or model of the network entities, as well as their relative spatial locations in the living structure 10.

The robot dock 140 may include or be connected to a power supply and include a charger operative to charge a battery of the mobile robot 200 when the mobile robot 200 is effectively docked at the robot dock 140. The dock 140 may be an evacuation station including a motorized receptacle actuatable to empty debris from the robot 200. In some embodiments, the dock 140 is connected (wired or wirelessly) to the private network 160 to enable or facilitate transmission of data from the robot 200 to the private network 160 and/or from the private network 160 to the mobile robot 200. The robot dock 140 may thus be considered as an automation controller device. In some embodiments, the robot dock 140 communicates directly with the mobile robot 200 through wireless means, including but not limited to Bluetooth, nearfield induction, IR, and/or radio communication signals. Each connected device 120, 122, 124, 126, 127, 128, 140, 142, 144 may include a wireless transceiver (such as a Wi-Fi transceiver) to communicate with the hub 110 and/or private network 160 via the WAP 164. While particular connected devices 30A, 34/34A, 36, 40, 110, 120, 122, 124, 126, 127, 128, 140, 142, 144, 150, 200 are shown by way of example, fewer or more connected devices may be included in the operating environment 10 and may be in communication with the private network 160.

Figure 2A:
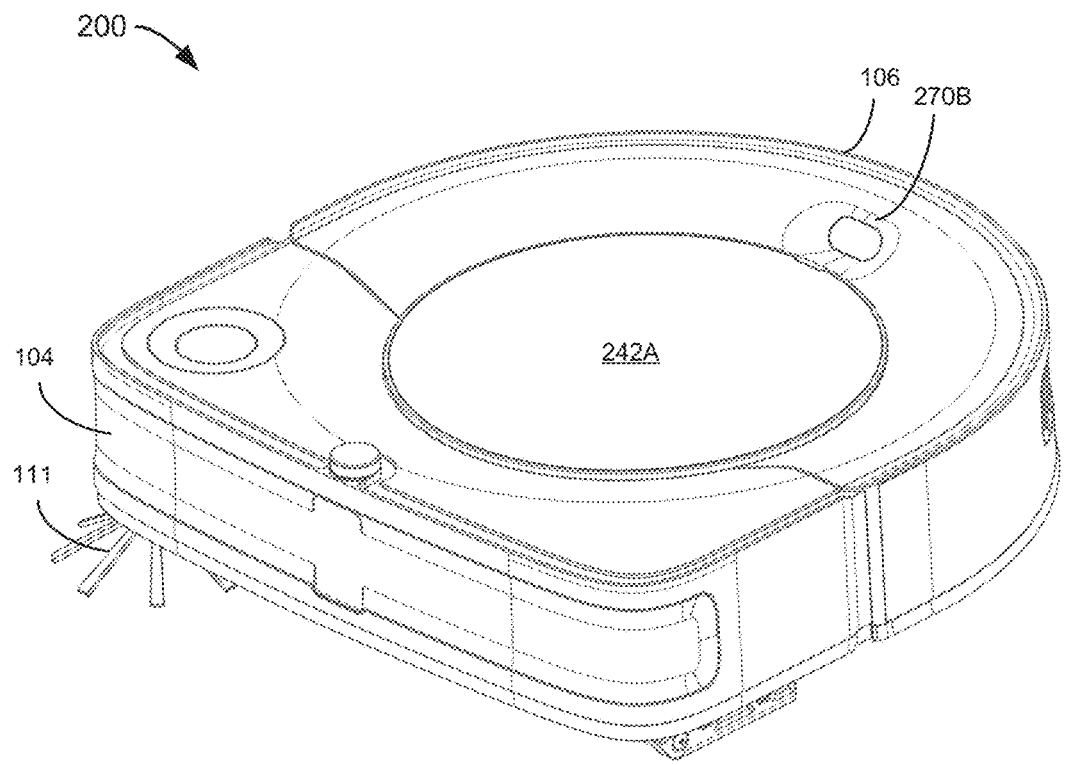
FIGS. 2A and 2B are top and bottom perspective views, respectively, of a mobile robot according to embodiments of the present disclosure, which is configured to operate in the system of FIG. 1A.
Figure 2B:
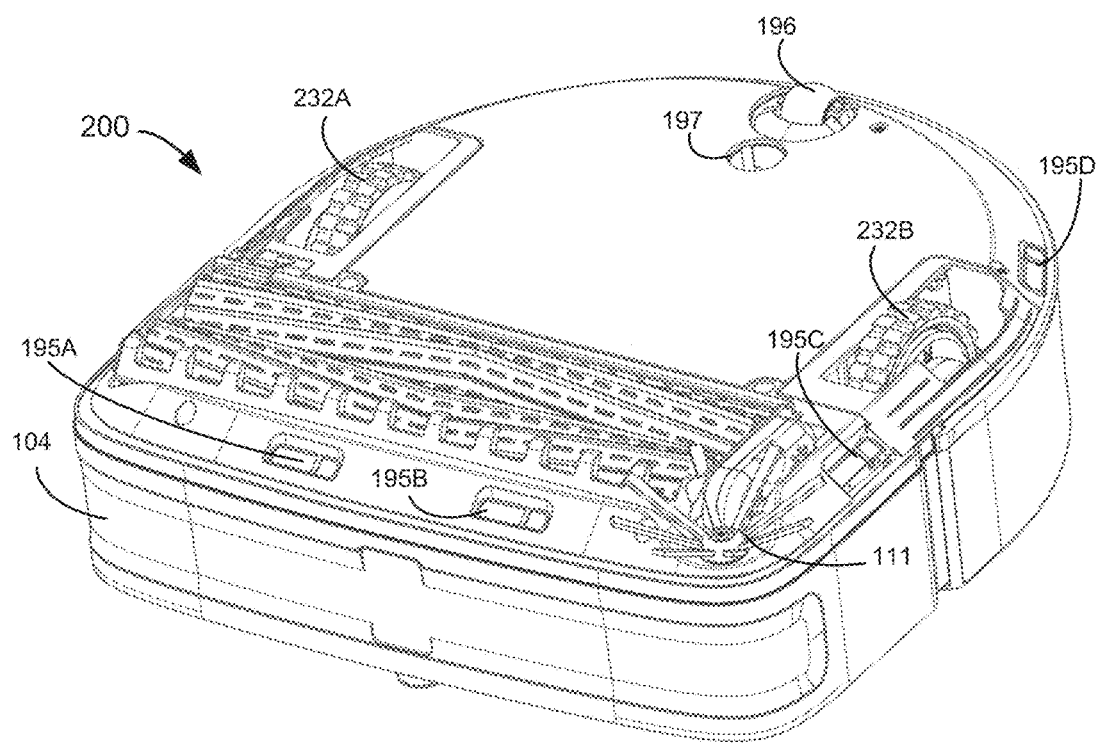
Figure 2C:
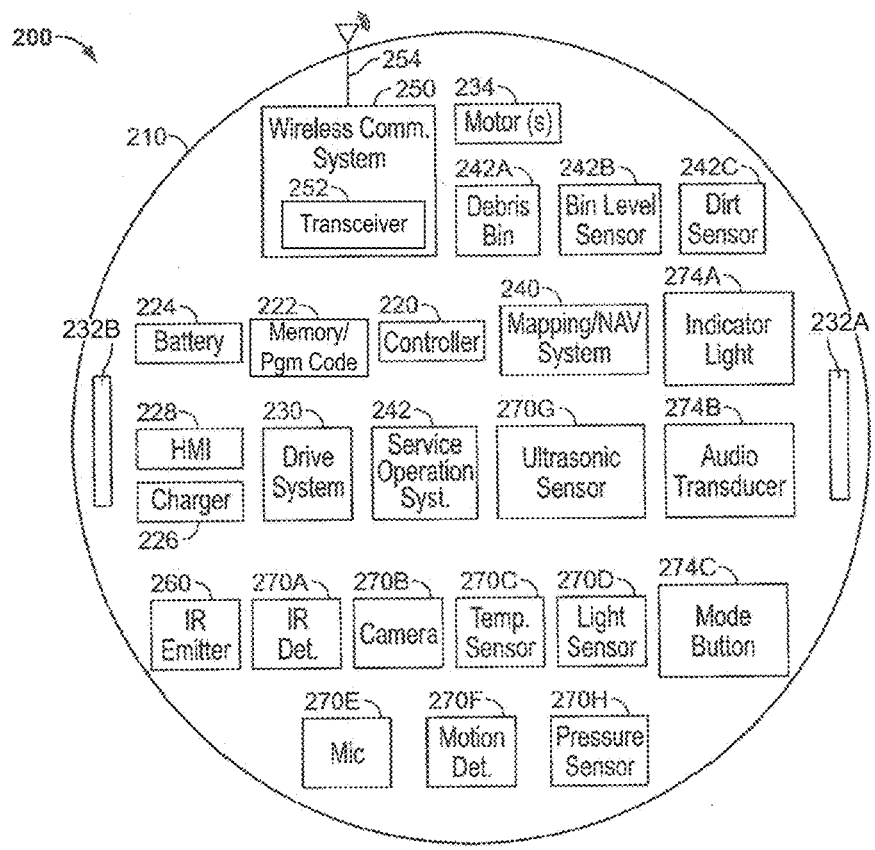
FIG. 2C is a schematic diagram representing a mobile robot according to embodiments of the present disclosure, which is configured to operate in the system of FIG. 1A.

The mobile robot 200 may be any suitable robot and associated computing device(s), and it will be appreciated that not all of the components, features and functionality described herein are required in mobile robots according to embodiments of the present disclosure. With reference to FIGS. 2A-2C, the example mobile robot 200 may include a chassis 210, a controller 220, memory 222, a battery 224, a battery charger 226, a human-machine interface (HMI) 228, a drive system 230, a mapping/navigation system 240, a service operation system 242 (also referred to herein as "cleaning system" and "cleaning head"), a wireless communication system 250, an IR emitter 260, and environmental sensors 270A-H, a debris bin 242A (to store debris collected by a cleaning operation), a bin level sensor 242B, a dirt extraction sensor 242C (to detect the density of characteristics of the debris collected by the cleaning operation), an indicator light 274A, an audio transducer 274B, and a cleaning mode selection switch or button 274C.

The environmental sensors 270A-270H may include a camera 270B mounted on a top surface of the mobile robot 200, as shown in the top perspective view of FIG. 2A. The camera 270B can be used to navigate the robot 200 and acquire images for other operational use. In some embodiments, the camera 270B is a visual simultaneous location and mapping (VSLAM) camera and is used to detect features and landmarks in the operating environment and build an occupancy map based thereon.

As shown in the bottom perspective view of FIG. 2B, the mobile robot 200 may further include a bumper 104, cliff sensors 195A-195D, an edge brush 111 mounted or otherwise positioned at a periphery of the mobile robot housing 106. The housing 106 is illustrated in FIGS. 2A-2B as having a squared front section on which the bumper 104 is mounted; however, the housing may have a rounded or circular shape in other embodiments. A caster wheel 196 may be provided on the underside of the mobile robot 200. In some embodiments, the caster wheel 196 may be positioned at an opposite end of the mobile robot 200 than the cleaning head 242, with the drive rollers/tracks 232A, 232B therebetween, such that the cleaning head 242 is a cantilevered arrangement. The mobile robot 200 may also include downward- or floor-facing camera 197. In some embodiments, the mobile robot 200 may be generally configured in the manner of or include features from floor cleaning robots and/or robots as described in U.S. Pat. No. 7,024,278 and U.S. Published Application No. 2007/0250212, the disclosures of which are incorporated herein by reference, with suitable modifications. In other embodiments, the mobile robot 200 may be generally configured as an autonomous patrolling robot that includes a telescoping mast having one or more elements associated with the sensor elements 270A-H and/or the wireless communication circuit or system 250 mounted thereon or otherwise operably associated therewith.

The controller 220 may include any suitably configured processor or processors. The processor(s) may include one or more data processing circuits, such as a general purpose and/or special purpose processor (such as a microprocessor and/or digital signal processor) that may be collocated or distributed across one or more networks. The processor is configured to execute program code stored in the memory 222, described below as a computer readable storage medium, to perform some or all of the operations and methods that are described above for one or more of the embodiments. The memory 222 is representative of the one or more memory devices containing the software and data used for facilitating operations of the robot in accordance with some embodiments of the present disclosure. The memory 222 may include, but is not limited to, the following types of devices: cache, ROM, PROM, EPROM, EEPROM, flash, SRAM, and DRAM. The processor is thus in communication with the controller 200, memory 222, the cleaning system 242 and drive system 230.

The drive system 230 may include any suitable mechanism or system for actively and controllably transiting the robot 200 through the living space 20. According to some embodiments, the drive system 230 includes a roller, rollers, track or tracks 232A, 232B and one or more onboard (i.e., carried by the mobile robot 200) electric motors 234 (collectively referred to herein as a "drive" or "drive system") operable by the controller 220 to convey the robot 200 across the floor of the operating environment 10.

The service operation system 242 may be optional in some embodiments, and is operable to execute a service operation in the living space 20. According to some embodiments, the service operation system 242 includes a floor cleaning system that cleans a floor surface of the living space 20 as the robot 200 transits through the space 20. In some embodiments, the service operation system 242 includes a suction head and an onboard vacuum generator to vacuum clean the floor. In some embodiments, the service operation system 242 includes an end effector such as (but not limited to) a sweeping or mopping mechanism, one or more rotating brushes, rollers, wet or dry stationary or oscillating and/or vibrating cloths, or multilayer pad assemblies.

The wireless communication system 250 includes a wireless communication transceiver or module 252 and an associated antenna 254 to enable wireless communication between the robot 200 and the various other connected devices 120, 122, 124, 126, 127, 128 in the operating environment 10, as well as network segments serviced by WAPs, gateways and hubs which make up the private network 160, of which the mobile robot 200 constitutes a node. For example, the wireless communication transceiver or module 252 may be a Wi-Fi module.

In some embodiments, the robot 200 may communicate wirelessly directly with the dock 140 using narrowband or broadband RF communication. For example, if the robot 200 is not equipped with a transmitter compatible with the WAP 164, the robot 200 may communicate with the dock 140, which may in turn relay data from the robot 200 onto the private network 160 and onward to the intended network entity (such as the remote management server 150). In some embodiments, the dock 140 includes a network bridge device that receives and converts RF signals from the robot 200 and relays them to the router 162 in a format supported by the router for delivery to the remote management server 150 or another device in the private network 160. In some embodiments, the dock 140 includes a low power mesh data network employing a mesh topology wherein RF communications signals are relayed from node to node between the mobile robot 200 and the dock 140. In this case, the connected devices 120, 122, 124, 126, 127, 128, 140 and range extender modules (if any; not shown) may serve as mesh nodes. Likewise, the mobile robot 200 may serve as a node to relay signals between the dock 140 and the other nodes (such as network enabled sensor devices 120, 122, 124, 126, 127, 128, 140 and range extenders).

The connected computing device 300 may be any suitable computing device(s), computer server(s) or cloud service(s), or a combination thereof, and it will be appreciated that not all of the components, features and functionality described herein are required in computing device(s) according to embodiments of the present disclosure. In some embodiments, the computing device 300 may a mobile robot, such as the mobile robot 200, or a component of the mobile robot. With reference to the example of FIG. 3, the computing device 300 includes one or more network interfaces 330, processor circuitry ("processor") 310, and memory 320 containing program code 322. The network interface 330 may include one or more network transmitters/receivers/transceivers configured to communicate through one or more wired and/or wireless networks with any associated available server(s) and/or data repositories. The processor 310 may include one or more data processing circuits, such as a general purpose and/or special purpose processor (such as a microprocessor and/or digital signal processor) that may be collocated or distributed across one or more networks. The processor 310 is configured to execute program code 322 in the memory 320, described below as a computer readable storage medium, to perform some or all of the operations and methods that are described above for one or more of the embodiments. The memory 320 is representative of the one or more memory devices containing the software and data used for facilitating operations in accordance with some embodiments of the present disclosure. The memory 320 may include, but is not limited to, the following types of devices: cache, ROM, PROM, EPROM, EEPROM, flash, SRAM, and DRAM.

Figure 3:
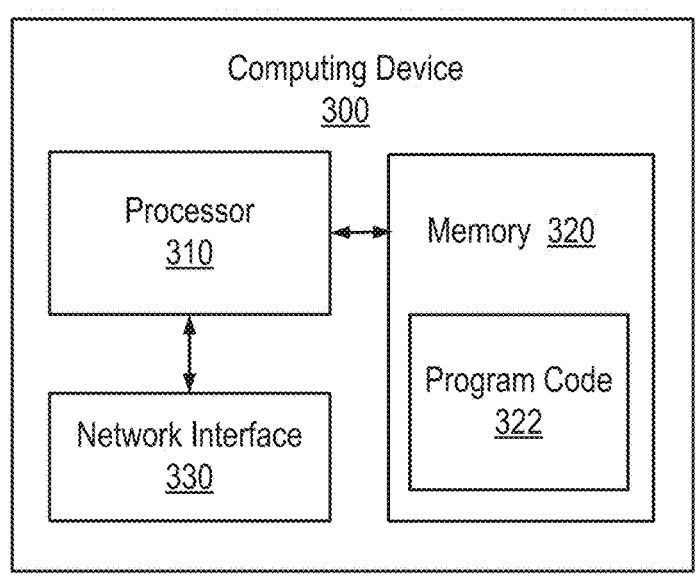
FIG. 3 is a schematic diagram representing a computing device according to embodiments of the present disclosure, which is configured to operate in the system of FIG. 1A.

The computing device 300 of FIG. 3 thus illustrates hardware/software architectures that may be used in generating visual status indicators for and/or controlling connected devices in the operating environment according to some embodiments described herein. However, it will be understood that embodiments of the present disclosure are not limited to such a configuration but are intended to encompass any configuration capable of carrying out operations described herein. The computing device 300 may thus more generally represent any device or network of devices having the capability to receive, process, enhance, store and transmit data or commands to and from one or more connected devices 30A, 34/34A, 36, 40, 120, 122, 124, 126, 127, 128, 140, 142, 144, 200 in service, using any appropriate combination of relevant methods and technologies. The computing device 300 may also provide additional processing to support other clients with different needs than the robot 200, such as visualizations and other rich UI interactions for presentation on user terminals 142, 144. In some embodiments, the functions assigned herein to the computing device 300 may also be performed wholly or in part locally on the robot, or in concert/coordination with a group of robots and/or servers or other computing devices in communication.

Figure 4A:
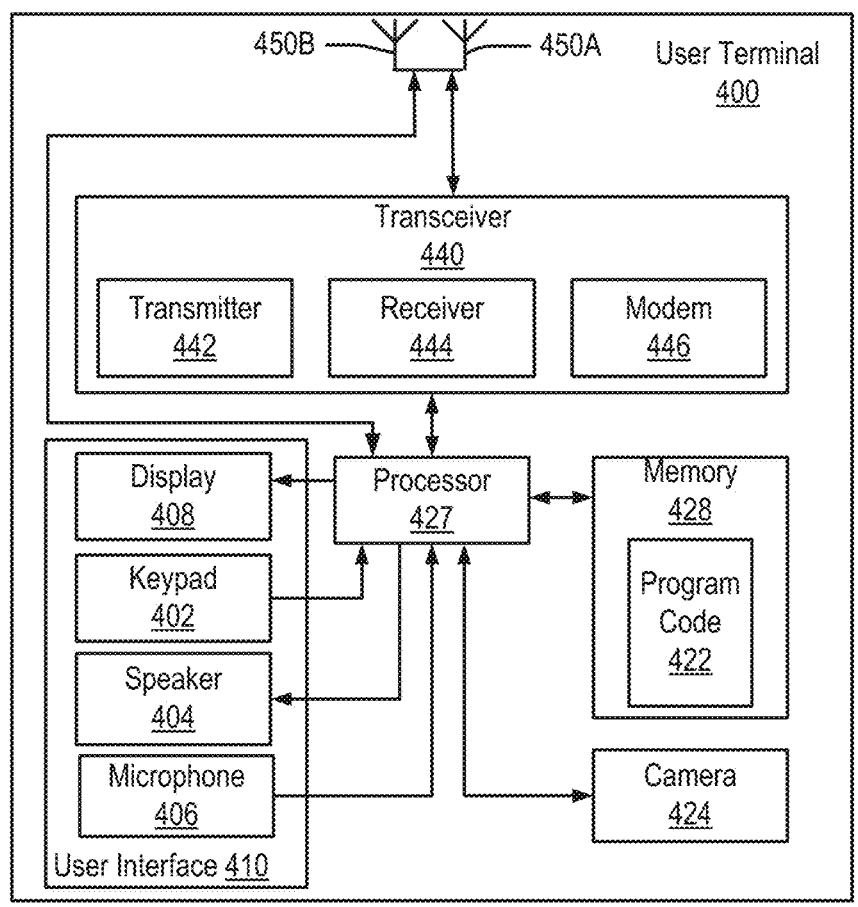
FIG. 4A is a schematic diagram representing a user terminal according to embodiments of the present disclosure, which is configured to operate in the system of FIG. 1A.

The user terminals 142, 144 may be any suitable stationary or mobile computing device(s) (including desktop computers, laptop computers, and "smartphones") and it will be appreciated that not all of the components, features and functionality described herein are required in user terminals according to embodiments of the present disclosure, and may be more generally represented by the user terminal 400 of FIG. 4A. With reference to the example of FIG. 4A, the user terminal 400 is configured to transmit and/or receive communication signals over multiple wired and/or wireless communication interfaces. For example, a transceiver 440 of the user terminal 400 according to some embodiments can include a cellular communication module, an infrared (IR) communication module, a global positioning system (GPS) module, a WLAN module, a wireless personal area network (WPAN) module, such as a Bluetooth, Wi-Fi, ZigBee, and/or Z-wave module, and/or other types of communication modules.

A user interface 410 of the user terminal 400 includes a display 408, such as a liquid crystal display (LCD) and/or an organic light emitting diode (OLED) display. The user interface 410 may optionally include a keypad 402 or other user input mechanism on the housing of the user terminal 400. In some embodiments, the display 408 may be provided with touch screen capability to replace and/or supplement the keypad 402. The user interface 410 may further include a microphone 406 and an earphone/speaker 404. The housing may be designed to form an acoustic seal to the user's ear when the earphone/speaker 404 is placed against the user's head.

The keypad 402, display 408, microphone 406, speaker 404 and camera 424 may be coupled to a processor 427, such as a microprocessor or microcontroller, which may be configured to control operations of the user terminal 400. The user terminal 400 may further include a transceiver 440 and a memory 428 coupled to the processor 427. Other electronic circuitry, such as a WLAN communication interface, a Bluetooth interface, a GPS interface, a digital signal processor, etc., may also be included in the electronic circuitry of the user terminal 400.

The memory 428 may be a general purpose memory that is used to store both program instructions 422 for the processor 427 as well as data, such as audio data, video data, configuration data, and/or other data that may be accessed and/or used by the processor 427. The memory 428 may include a nonvolatile read/write memory, a read-only memory and/or a volatile read/write memory. In particular, the memory 428 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored.

The transceiver 440 includes a transmitter circuit 442, a receiver circuit 444, and a modem 446, which cooperate to transmit and receive radio frequency signals to remote transceivers via an antenna array 450A, 450B. The radio frequency signals transmitted between the user terminal 400 and the remote transceivers may include both traffic and control signals (for example, paging signals/messages for incoming calls), which are used to establish and maintain communication with another party or destination. More particularly, the transceiver 440, in cooperation with the processor 427, may be configured for communication according to multiple radio access and/or wireless networking technologies, including (but not limited to) cellular, WLAN (including 802.11), WiMAX (Worldwide Interoperability for Microwave Access), Wi-Fi, Bluetooth, ZigBee, and/or Z-wave. Other radio access technologies and/or frequency bands can also be used in embodiments according to the present disclosure.

With reference again to FIG. 2C, the mobile robot 200 may include a localizing circuit that builds a metric, range-based map of walls and obstacles (using, for example, a laser range finder, sonar, radar, triangulation, time-of-flight, or phase difference calculating) and/or an occupancy map of free space (for example, traversable floor space, or floor space not occupied by an object or fixture). The mobile robot 200 can localize the robot on the map(s) using techniques such as scan matching, ICP (iterative closest point), and/or RANSAC (RANdom Sample consensus). Additionally or alternatively, the mobile robot 200 may include a localizing circuit that builds a fingerprinted, feature-based constellation or topological map of features, landmarks, fiducials and/or beacons (using, for example, a camera or point cloud generating 3D scanner, together with a feature transform to identify, store, and recognize natural or artificial keypoints, features, and/or landmarks) within an occupancy map of free space, and can localize the robot on this occupancy map using techniques such as VSLAM (vision-based/visual simultaneous localization and mapping). The data collected by the localizing circuits of the mobile robot 200 based on navigation of an environment is generally referred to herein as occupancy data for the environment. A unique identity for unique rooms or areas (illustrated as Zone 1, Zone 2, Zone 3) may be associated by an end user with a household room-type or unique room label ("Living Room") via the user interface of any of the network entities, or may be automatically determined by recognition of landmarks or devices therein. The occupancy data (which may be visually represented as a "floorplan map" for the operating environment) may include data defining multiple surface locations of the environment 10 (for example, by pixels), each having a value that corresponds to whether the pixel location corresponds to a surface location that is occupied, traversable by the mobile robot 200, or unexplored.

The localizing circuit may be defined by inputs from one or more of the sensors 270A-270H of the mobile robot 200, which may be used by the controller 220 to perform localization in the operating environment 10. More particularly, one or more of the localizing sensors 270A-270H are configured to detect sensor readings from objects located in the operating environment 10, and the controller 220 is configured to determine a current pose (a "pose" includes an absolute or relative location and optionally an absolute or relative orientation) of the mobile robot 200 with reference to the observed objects ("objects" not only including physical objects including observable features, as well as surface "objects" formed of optically or otherwise detectable surface characteristics such as corners, lines, patterns) based on the localization data detected by the localizing sensors 270A-270H. Poses for objects may be determined as well. The mobile robot 200 may be further configured to associate a robot pose (or location) with a room identifier specifically associated with the observed objects or their poses stationed in the room or observable upon the room's components (walls, ceiling, lighting, doorway, furniture), as indicated by the occupancy map.

Figure 4B:
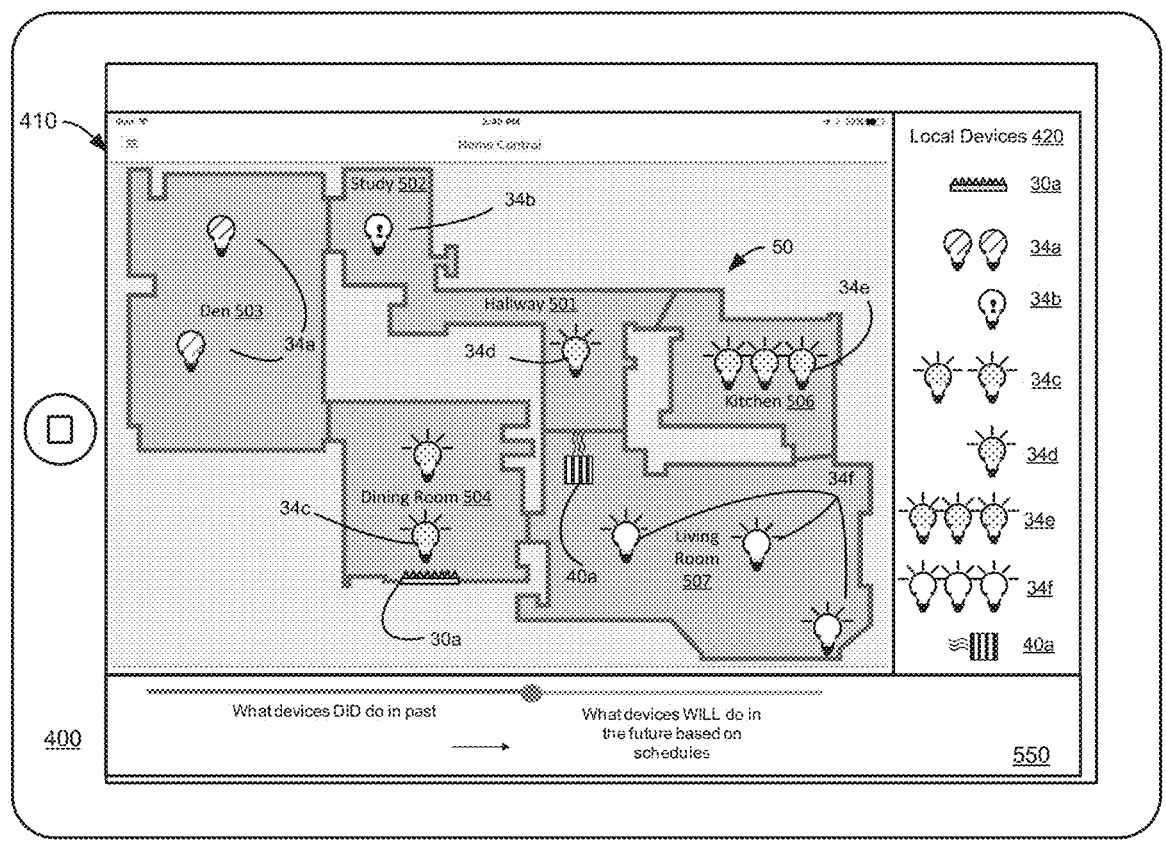
FIG. 4B is a plan view of a user terminal including a user interface configured to display a visual representation of an operating environment and control connected devices therein according to embodiments of the present disclosure.

According to embodiments of the present disclosure, a visual representation of the occupancy data collected by the localizing circuits of the mobile robot 200 responsive to navigation of an operating environment may be displayed on a user terminal to enhance awareness and/or control of the operating states of one or more of the electronic devices that are local to the operating environment, such as the connected devices 30A, 34/34A, 36, 40, 110, 120, 122, 124, 126, 127, 128, 140, 200 described by way of example herein. FIG. 4B is a plan view of the user terminal 400 including an example user interface 410 configured to indicate operating status and/or control connected devices therein according to embodiments of the present disclosure.

With reference to FIG. 4B, the user interface 410 of the user terminal 400 is configured to display a visual representation 50 of the occupancy map, also referred to herein as a floorplan map. The floorplan map 50 indicates the relative locations or spatial context of one area or room of the operating environment to another (shown as a Den 503, Study 502, Hallway 501, Dining Room 504, Kitchen 506, and Living Room 507), for example, based on the presence or absence of physical boundaries between the areas as indicated by the occupancy data. The room name/type/label may be manually entered by a user, or may be automatically determined based on recognition of objects or connected devices therein. The floorplan map 50 is populated with icons 30a, 34a-34f, and 40a representing electronic devices that are within boundaries of or local to the operating environment. The placement of the icons 30a, 34a-34f, and 40a on the floorplan map 50 indicate the respective spatial locations of the electronic devices relative to the rooms/areas, while graphical characteristics of icons 30a, 34a-34f, and 40a indicate the respective operating states of these electronic devices. The user interface 410 may also be configured to display a listing 420 of the devices that are local to the operating environment and a user input element 550 configured to receive a user-specified time over a user-specified temporal range for which operating state information is desired, as described in greater detail below with reference to FIG. 5.

FIGS. 5-8 are schematic plan views illustrating operations for displaying and controlling operation of electronic devices based on their relative spatial locations in an operating environment, according to some embodiments of the present disclosure. Some embodiments of FIGS. 5-8 are described and illustrated primarily with reference to displaying and controlling operation of lighting-related devices (such as light fixtures 34, exhaustible lamps 34A, and window blinds 30A of FIG. 1B) by way of example. However, it will be understood that embodiments of the present disclosure are not so limited, but rather, may include displaying and/or controlling operation of other electronic devices that are local to the operating environment, including but not limited to lights/light bulbs, door/window sensors, door locks, speakers, thermostat, environmental sensors (including but not limited to temperature, humidity, air quality, and illumination level sensors), window blinds, voice interface devices, monitoring cameras, etc.

Figure 5:
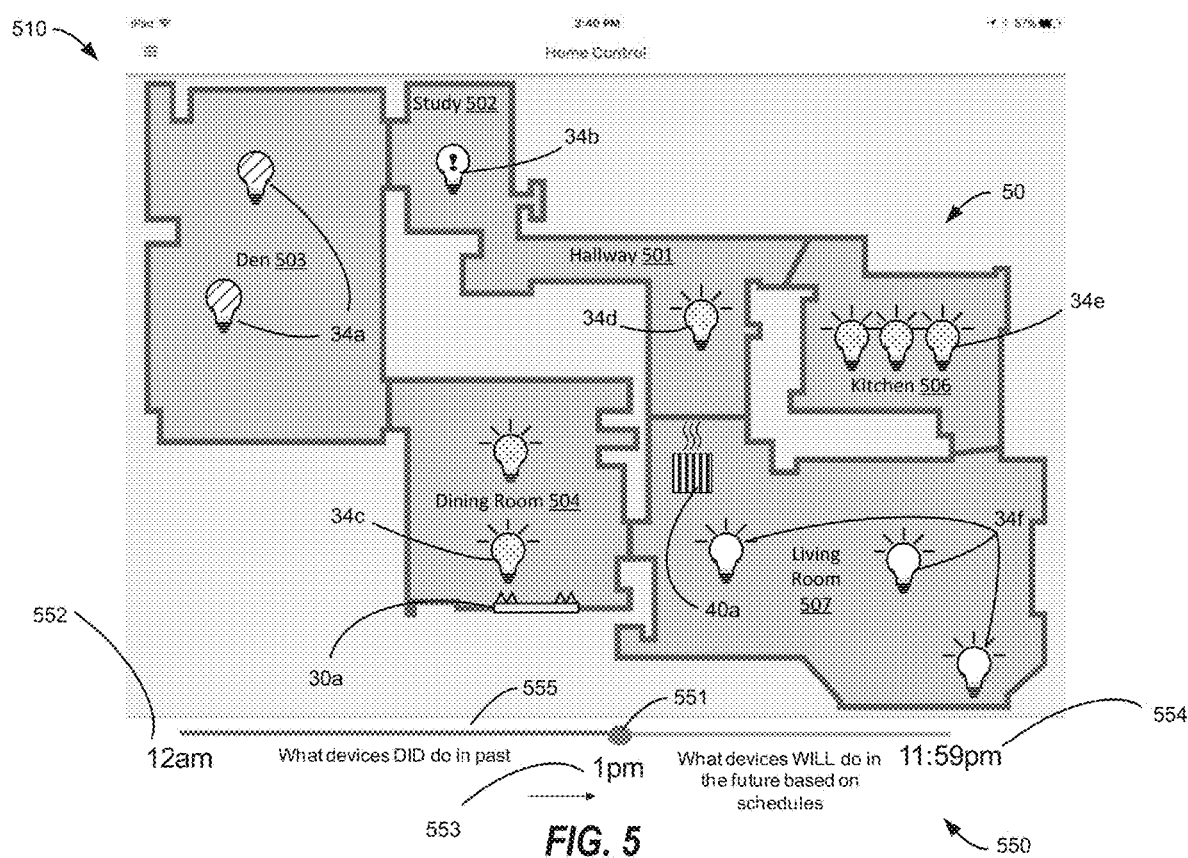
FIG. 5 is a plan view illustrating example operations for displaying a visual representation of an operating environment indicating relative spatial locations of devices and operational states thereof according to embodiments of the present disclosure.

The plan view of FIG. 5 illustrates example operations for displaying a visual representation of an operating environment that visually indicates relative spatial locations of devices and operational states thereof according to embodiments of the present disclosure. More particularly, FIG. 5 illustrates an example user interface 510 of a user terminal (such as the user terminals 142, 144, 400) displaying a visual representation 50 of an operating environment (such as the living space 20 of FIGS. 1A-1B). The visual representation is illustrated as a floorplan map 50, which is populated with icons 30a, 34a-34f, 40a indicating respective spatial locations and operating states of electronic devices in the operating environment. In the example of FIG. 5, the electronic devices represented by the icons 34a-34f are connected light bulbs/fixtures (such as the light fixtures 34 and/or exhaustible lamps 34A of FIG. 1B), the electronic device represented by the icon 30a is a connected window blind (such as the window blind 30A of FIG. 1B), and the electronic device represented by the icon 40a is a connected HVAC vent (such as the vent of the HVAC system 40 of FIG. 1B). The populated floorplan map 50 provides a visual "snapshot" of the operating environment, with the icons 30a, 34a-34f, 40a indicating the locations and states of detected or user-specified devices. The user interface 510 can thus visually indicate whole-home operating patterns and confirm that the devices represented by the icons 30a, 34a-34f, 40a are operating and/or cooperating according to user expectations.

The floorplan map 50 may be populated with the icons 30a, 34a-34f, 40a automatically (i.e., without human intervention) and/or responsive to user input via the user interface 510. For example, a user terminal executing an application that provides the user interface 510 may receive information identifying electronic devices in the operating environment (including both connected and non-connected devices) and/or their respective operating states from one or more network sources, including but not limited to the mobile robot 200, hub 110, controller 120, or other connected device. The list 420 identifying the local devices and/or operating states may thereby be generated. Additionally or alternatively, the information identifying the devices and/or their operating states may be received via the user interface, for example, via manual entry in the list of devices 420. Likewise, the respective spatial locations of the devices represented by the icons 30a, 34a-34f, 40a may be determined automatically (for example, from occupancy data and/or wireless signal coverage data collected by the mobile robot) and/or responsive to receiving a user input (for example, a drag-and-drop input from the list of devices 420 of FIG. 4B).

The user interface 510 of FIG. 5 further includes a user input element 550 configured to receive a user specification of a time for which operating state information for the devices represented by the icons 30a, 34a-34f, and/or 40a is desired. In the example of FIG. 5, the user input element 550 is illustrated as a time-slider bar, which is configured to receive a user input that manipulates slider element 551 to respective positions along a length of bar element 555. The bar element 555 visually represents a temporal range, for which operating state information for the devices represented by the icons 30a, 34a-34f, and/or 40a has been stored or is otherwise accessible. Markings indicating respective times 552, 553, 554 (which are past, present, and future times, respectively) are provided along the length of the bar element 555. The user interface 510 is configured to detect a position of the slider element 551 along the length of the bar element 550 responsive to manipulation of the slider element or other user input, from which the user terminal is configured to determine the time specified by the user input based on correspondence of the position of the slider element 551 along the temporal range represented by the bar element 555. The user interface 510 is thereby configured to display status indications representing the operating states of the devices represented by the icons 30a, 34a-34f, and/or 40a that are associated with temporal data corresponding to the time specified by the user input (also referred to herein as temporal status indications).

The temporal range visually represented by the user input element 550 may also be specified by a user in some embodiments. For example, the bar element 555 shown in FIG. 5 represents a time period of one day, with marking 552 at one end of bar element 555 corresponding to "12 am" and marking 554 at the other end of bar element 555 corresponding to "11:59 pm," and whereby manipulation of the slider element 551 results in the display of a time (via marking 553) that is within the single day represented by the bar element 555, depending of the relative position of the slider element 551 along the length of the bar element 555. FIGS. 11A-11E illustrate example information regarding the operating states and interoperation of operating states of electronic devices in the operating environment 50 that may be displayed responsive to real-time manipulation of the slider element 551 along the length the bar element 555 selected to represent a temporal range of one day.

In another example, the bar element 555 may be selected to represent a temporal range of one week, with marking 552 at one end of bar element 555 corresponding to "Sunday" and marking 554 at the other end of bar element 555 corresponding to "Saturday," and whereby manipulation of the slider element 551 results in the display of a day of the week (for example, Monday, Tuesday, Wednesday, Thursday, Friday; via marking 553) that is within the week represented by the bar element 555, depending of the relative position of the slider element 551 along the length of the bar element 555. Positioning the slider element 551 between consecutive days (for example, between Monday and Tuesday) may display a time of day (for example, 12 pm) between the consecutive days. Sub-portions of a day, weeks, months, etc. may be similarly represented by the bar element 555 and the relative position of the slider element 551 along the length thereof. More generally, the temporal range represented by the user input element 550 may be user-selectable, and the manipulation of the slider element 551 along the bar element 555 may display a different range and unit of time measurement (hours, days, weeks, etc.) based on the selected temporal range.

As such, the user interface 510 is be configured to display temporal status indications for the devices represented by the icons 30a, 34a-34f, and/or 40a, corresponding to the time selected or otherwise specified by the user via the user input element 550. Such temporal status indications may include actual device operating status information (based on actual past or present operation of the devices, as previously logged or currently reported), and/or expected device operating status information (based on scheduled future operation of the devices, as specified by a user), depending on the position of the slider element 551. The actual and expected/scheduled operating states (and the past, present or future temporal data associated therewith) may be continually logged and updated by the devices 30A, 34/34A, 36, 40 themselves and/or by a connected computing device coupled thereto (such as one or more of the network nodes 110, 120, 122, 124, 126, 127, 128, 200, 140, 142, 144, and 150), and may be stored in a database that is accessible to one or more of the connected devices via the networks 160 and/or 170. For example, in some embodiments, a computing device (such as the computing device 300) may receive data indicating actual operating states (and associated past or present temporal data) and/or expected operating states (and associated future temporal data) of the electronic devices from one or more different sources, including but not limited to the hub 110, controller 120, mobile robot 200, or other connected device, and may store the respective operating states of the electronic devices and the temporal data associated therewith in a database. The data indicating the operating states and associated temporal data may be requested (or "pulled") by the computing device, or may be reported (or "pushed") by the electronic devices and/or network sources in communication therewith.

Figure 11A:
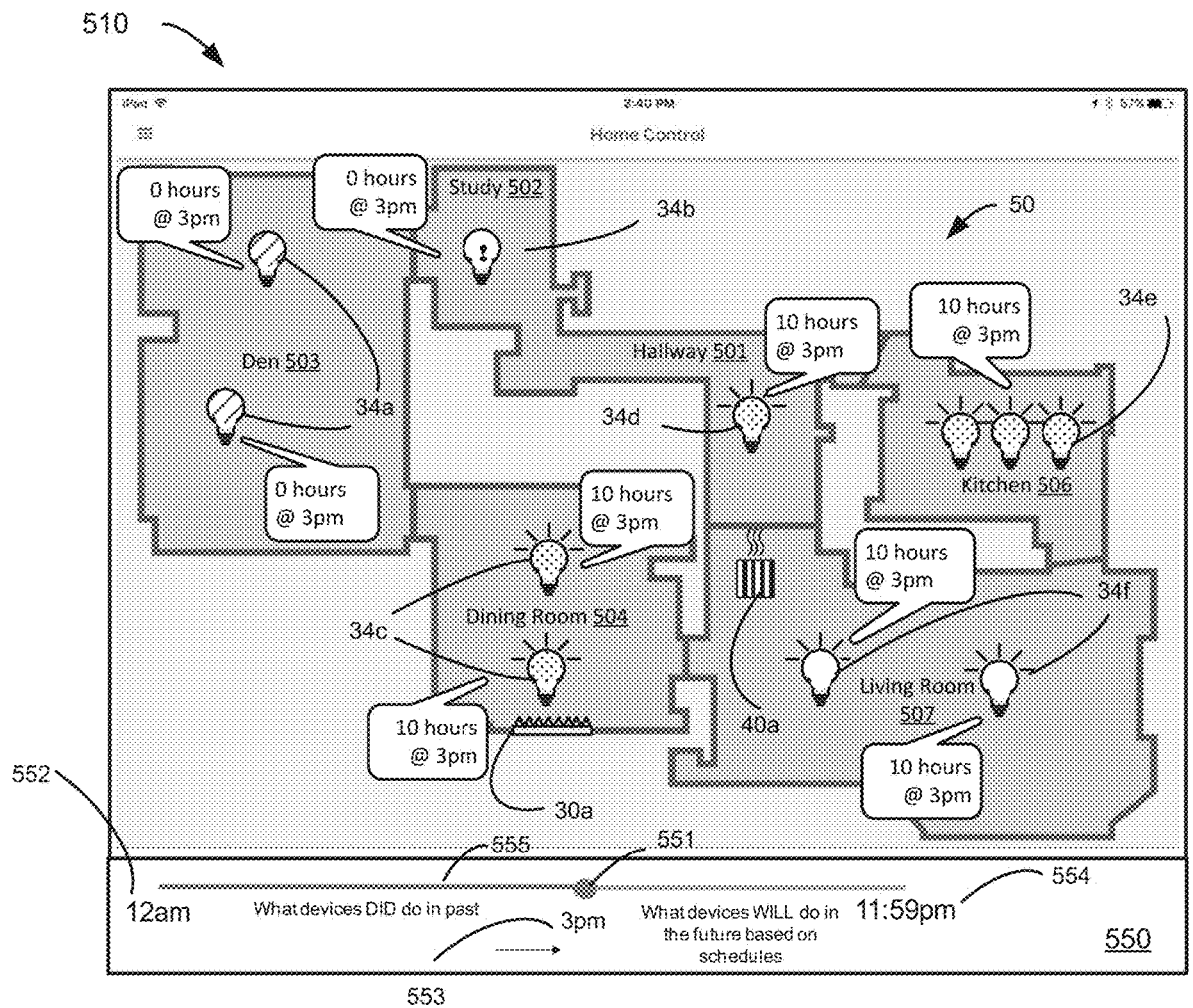
FIGS. 11A-11E are plan views illustrating example operations for displaying a visual representations of an operating environment indicating relative spatial locations of devices and operational states thereof according to embodiments of the present disclosure.
Figure 11B:
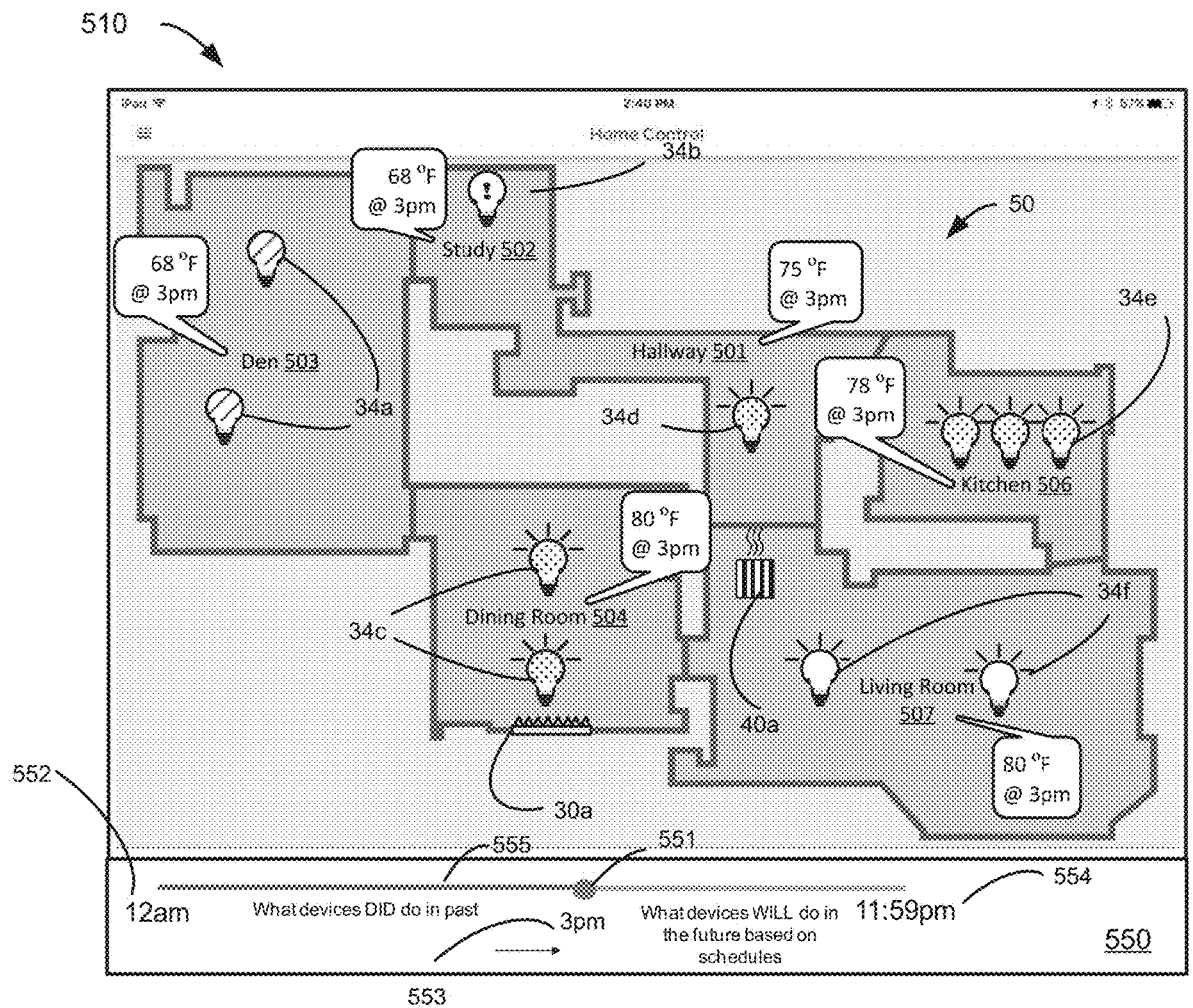
Figure 11C:
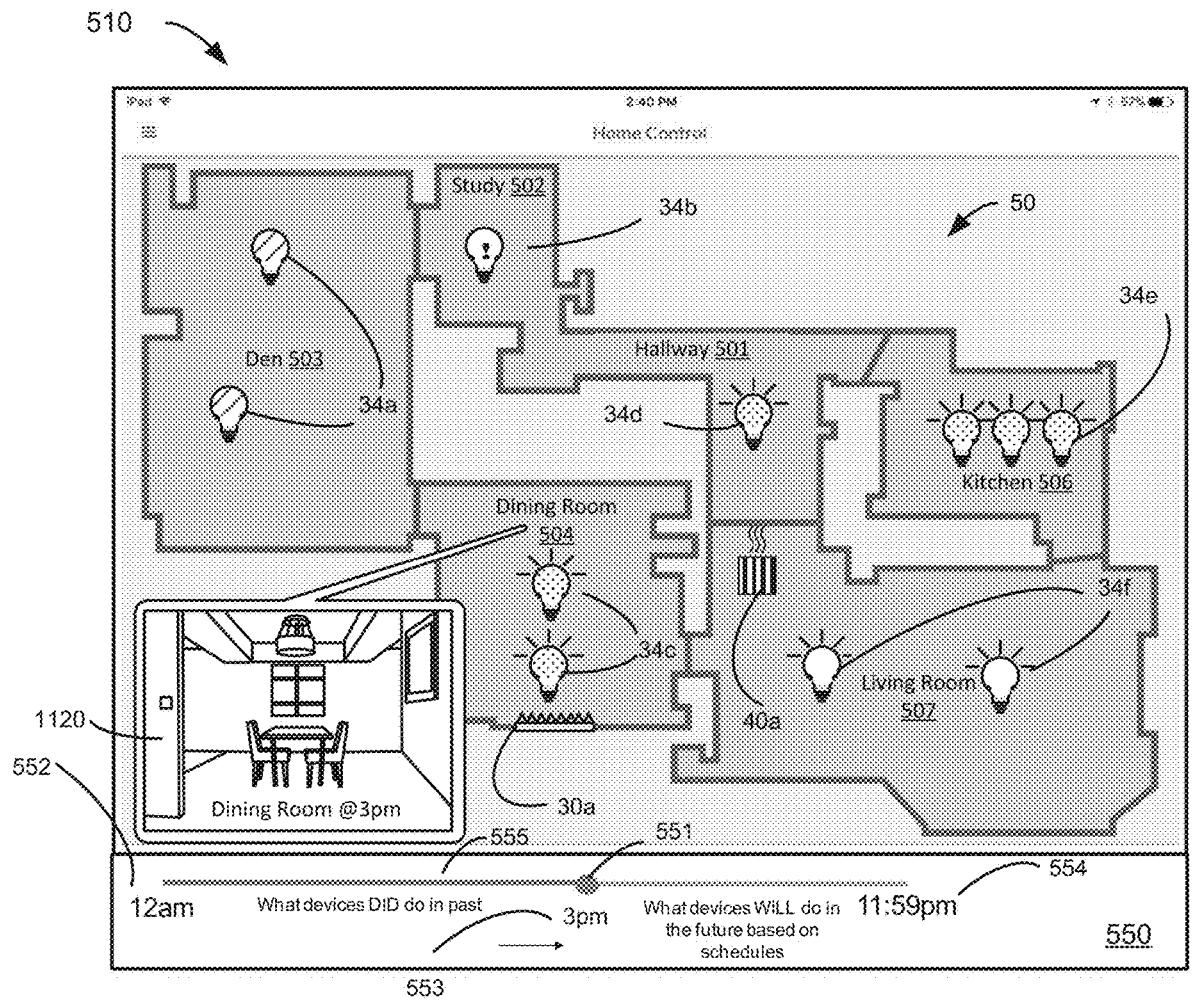
Figure 11D:
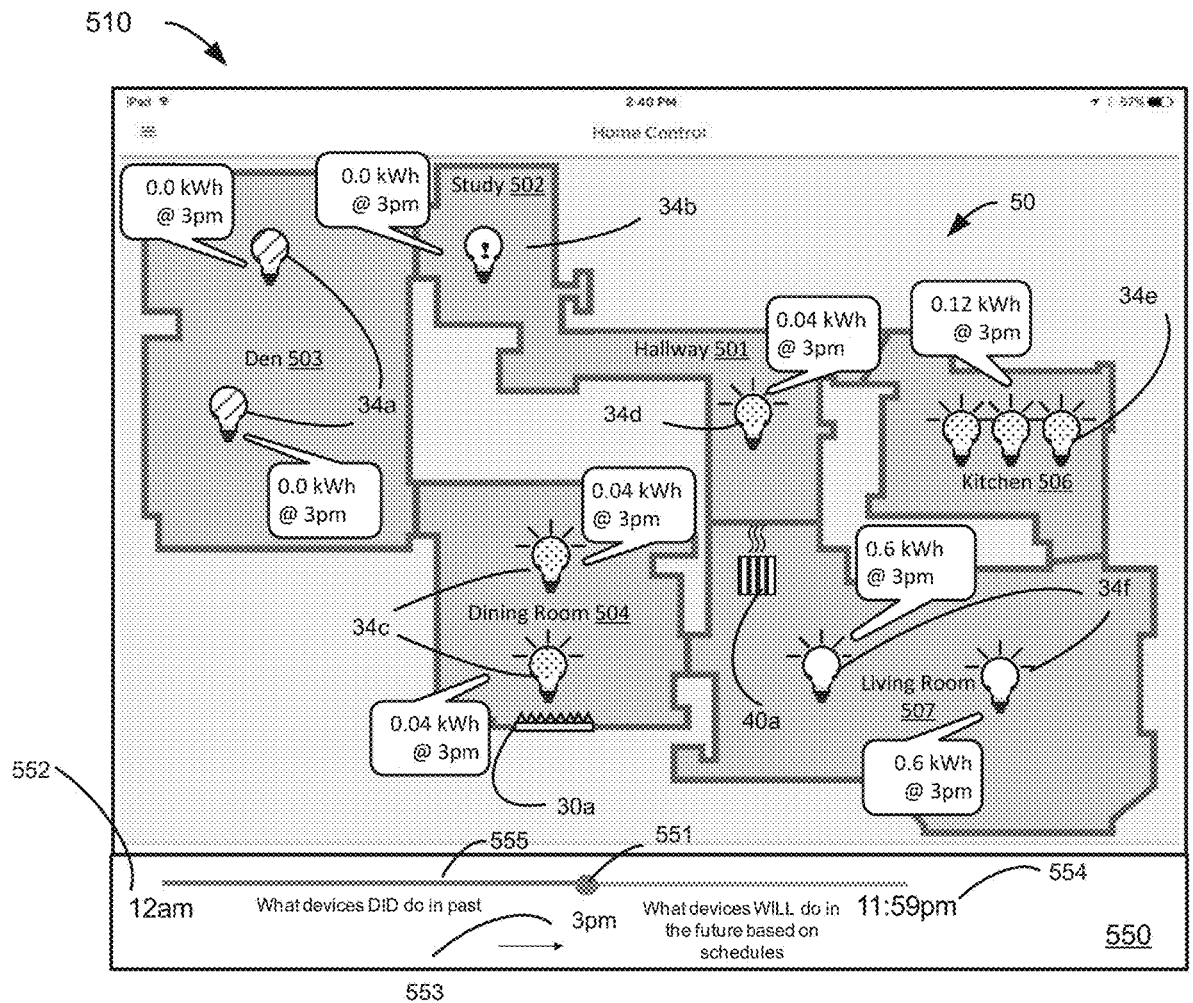

In some embodiments, past temporal status indications may include, but are not limited to the following presentations of information: when/how long lights were on/off in the past or whether lights were left on (as shown for example in FIG. 11A as respective hours of operation for the lighting devices 34A that change based on the relative position of the slider element 551 over the displayed period represented by the length of the bar element 555); where/when motion was detected; whether the devices perform as-scheduled by the user; how temperature changed over the day (for example, as indicated by operation of environmental sensors or as set by thermostat, as shown in FIG. 11B as respective temperatures that change corresponding to the relative position of the slider element 551 over the displayed period represented by the length of the bar element 555); the time(s) at which doors or windows opened/closed; the times at which a door was locked and unlocked; and/or a mapped display of location specific temperature, humidity, and/or air quality readings from sensors on the mobile robot 200 and/or stationary environmental sensors positioned throughout the environment. In addition, the user interface 510 may be configured to display recorded images/videos from monitoring cameras as an overlay 1120 on the map 50, which changes corresponding to the time selected via input element 550, as shown for example in FIG. 11C. In embodiments, the time selected via the input element 550 is associated with a timestamp in a video feed collected and stored by the mobile robot 200 and the image/video corresponds to an image captured at that selected time by the monitoring camera mounted to the mobile robot 200. Also, based on information received from connected energy monitor devices, the user interface 510 may be configured to visually represent energy usage by device (or total by room) instantaneously or over a given time period, as shown for example in FIG. 11D as respective kilowatt-hours of operation for the lighting devices 34A, which changes based on the relative position of the slider element 551 over the displayed period represented by the length of the bar element 555. More generally, the past temporal status indications may provide a viewable history of the instantaneous operation and operating patterns of electronic devices throughout the operating environment at a user-specified time or over a user-specified time range.

Figure 11E:
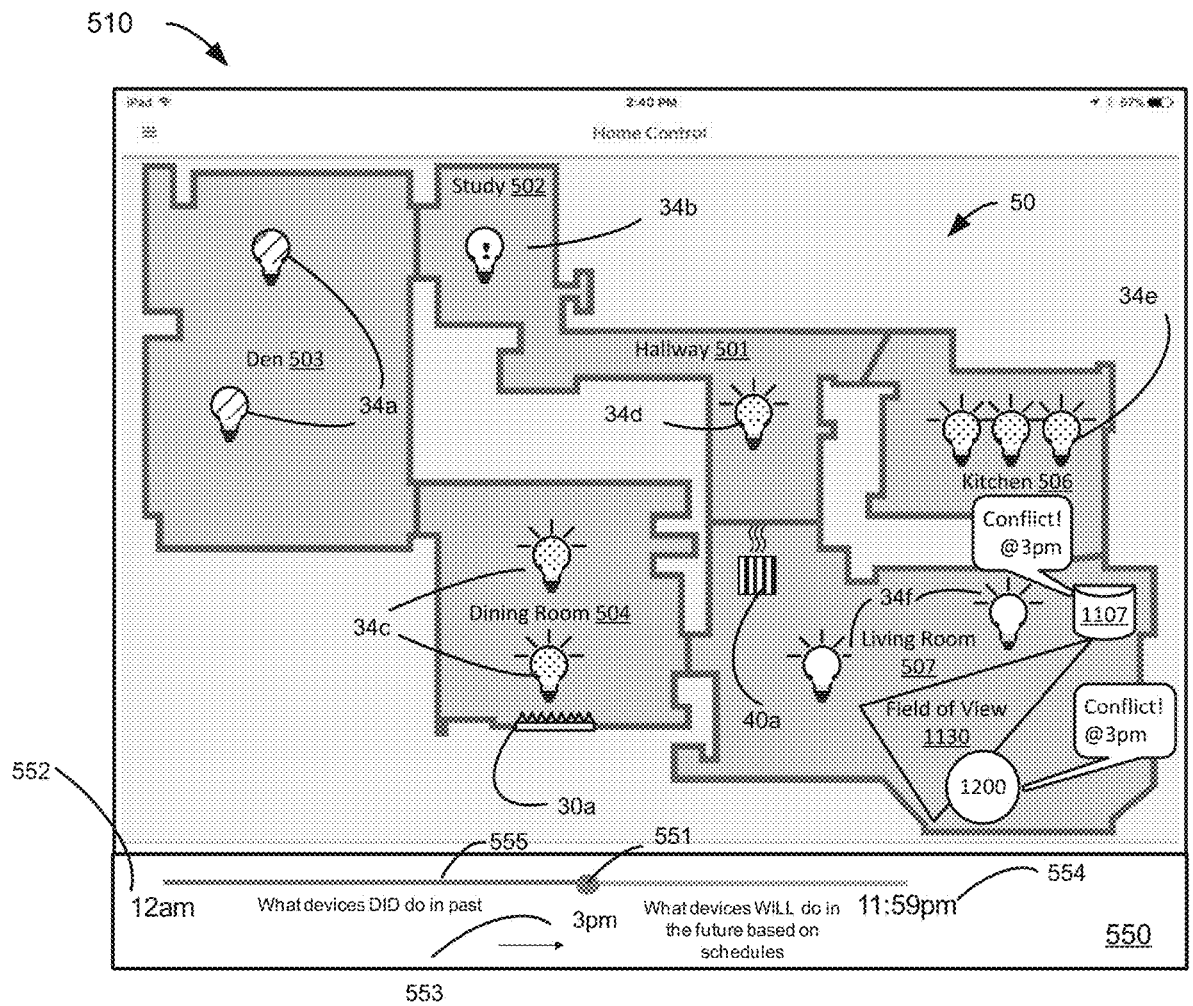

In some embodiments, future temporal status indications may include, but are not limited to, the following presentations of information: the device schedules for the rest of the day; the time(s) at which the lights in the living spaces illuminate (e.g., automatically at the scheduled time); information regarding whether the blinds will close around sunset; information regarding whether all devices shut off for the night at the scheduled time; whether the thermostat is set as expected for night mode operation; whether the door locks scheduled to lock at night; whether the alarm system sensors set to be armed tonight; and/or the next scheduled time at which the mobile robot 200 (e.g., a robot vacuum) will launch and start a mission. The future temporal status indications may thus provide a viewable schedule of operating patterns of electronic devices throughout the operating environment over a user-specified time range. Conflicts, such as location-based conflicts between two or more scheduled operations of devices, may also be visually indicated. As used herein, a conflict between two or more devices may refer to a condition in which the operation of one device may interfere with or otherwise be problematic with respect to the operation of another device. For example, as shown in FIG. 11E, if the motion sensors 1107 for the alarm system are armed for a time during which operation of the robot vacuum 1200 is scheduled in an area of the operating environment 50 within a field of view of the motion sensors 1107, the user interface 510 may indicate the conflict, via a combination of icons and/or text, responsive to selection of the time by the relative position of the slider element 551 over the displayed period represented by the length of the bar element 555.

The icons 30a, 34a-34f, 40a may visually represent or indicate operating state in any number of ways, including by shading, color, symbols, punctuation, and/or text. For example, as shown in FIG. 5, the icons 34f representing the light bulbs/fixtures in the Living Room 507 have a solid pattern to indicate that these light bulbs/fixtures are on, while the icons 34a representing the light bulbs/fixtures in the Den 503 are shaded to indicate that the light bulbs are off. The icons 34c, 34d, and 34e representing the light bulbs/fixtures in the Dining Room 504, Hallway 501, and Kitchen 506 (all of which are spatially adjacent the Living Room 507) are speckled to indicate that the light bulbs/fixtures are dimmed. Meanwhile, the icon 34b representing the light bulb/fixture in the Study 502 displays an exclamation point (!) to indicate a problem with its operation. These visual indications are provided by way of example only, and it will be understood that other visual indications and/or text may be displayed by the user interface 510 to indicate the actual or expected/scheduled operating states of the devices represented by the icons 34a-34f responsive to a user selection of a time of operation and desired range of times via the slider bar 550. More generally, the user interface 510 may visually indicate actual or expected patterns of activity of the devices represented by the icons 34a-34f throughout the operating environment responsive to a user input specifying a desired time.

The floorplan map(s) described herein may be generated based on occupancy data detected by localizing sensors of a mobile robot (such as the sensors 270A-H of the mobile robot 200 of FIGS. 2A-2C) responsive to navigation of the operating environment. In some embodiments, the relative spatial locations of the local electronic devices may be determined based on the occupancy data and/or based on signal coverage data acquired by a wireless transceiver of the mobile robot (such as the wireless transceiver 252 of the mobile robot 200 of FIGS. 2A-2C). Operations for generating maps and determining spatial locations based on occupancy data and/or signal coverage data acquired by a mobile robot are further described in commonly-owned U.S. patent application Ser. No. 15/588,117 filed on May 5, 2017, the disclosure of which is incorporated by reference herein in its entirety.

The list 420 of electronic devices that are local to the operating environment may be generated based on information identifying the devices and/or operating states thereof received via the network 160 or 170. For example, devices and/or operating status may be identified by requesting information kept by gateways/hubs (such as the hub 110 of FIG. 1B) about the devices to which they are coupled. In a particular example, the hub 110 may include hardware/software for connection with and control over IoT devices from a consolidated user interface (for example, a SmartThings™ or Wink hub), and devices coupled to the SmartThings™ or Wink hub may be identified by interrogating the hub. In another example, a networked home energy monitoring device, such as a Sense home energy monitor, may automatically detect and identify devices and operating data (whether network-enabled or not) based on their power draw. That is, the list 420 (and/or the populated floorplan map 50) may visually represent electronic devices that are produced by different manufacturers and/or operate according to different protocols. Other operations for obtaining device identification may include (but are not limited to) performing a port scan to identify services exposed, pattern-matching against received responses, and/or interacting with discovered services to extract more structured information (for example, attributes that the device advertises through network 'discovery' protocols such as UPnP or mDNS). Additionally or alternatively, the information identifying the devices, the operating states thereof, and/or the spatial locations thereof may be received via the user interface, for example, by manual entry in the list of devices 420. For instance, the icons 30a, 34a-34f, 40a shown in the list 420 may be dragged-and-dropped into respective positions on the map 50.

Figure 6:
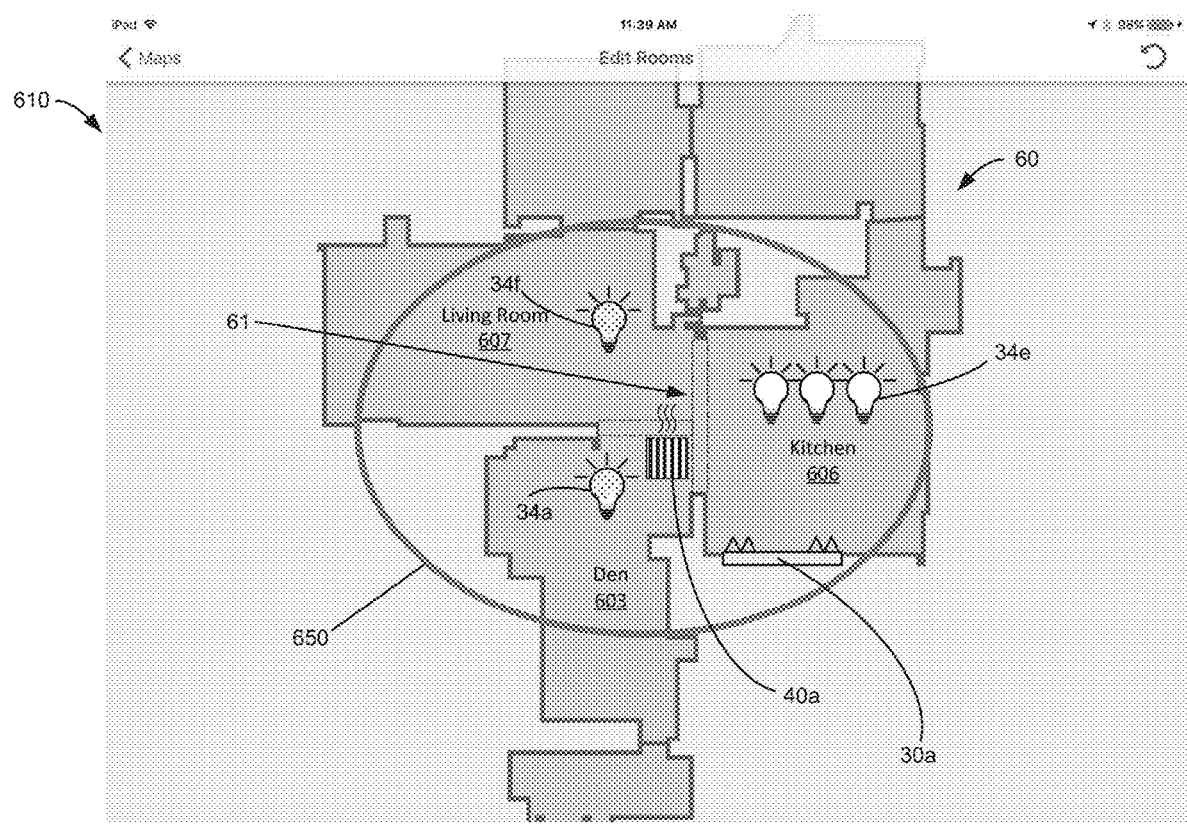
FIG. 6 is a plan view illustrating example operations for controlling connected devices in a contiguous living space according to embodiments of the present disclosure.

Connected computing device(s) as described herein may further be configured to transmit control signals to control operation of one or more electronic devices based on their respective spatial locations in the operating environment and the relative spatial context of the areas in which they are located. In some embodiments, the floorplan map may indicate the presence or absence of walls and/or obstacles dividing one area/room of the operating environment (and devices located in the area/room) from another. FIG. 6 is a plan view illustrating an example user interface 610 of a user terminal (such as the user terminal 142, 144, 400) for controlling connected devices in a contiguous living space extending between multiple, adjacent rooms without walls or barriers therebetween according to embodiments of the present disclosure.

As shown in FIG. 6, based on occupancy data collected by one or more localizing sensors of a mobile robot (such as the mobile robot 200) responsive to navigation of an operating environment (such as the living space 20), the user interface 610 displays a visual representation 60 of the operating environment. The visual representation is illustrated as a floorplan map 60, which is populated with icons 30a, 34a/e/f, 40a indicating the respective spatial locations and operating states of detected or user-specified electronic devices that are local to the operating environment. In the example of FIG. 6, the electronic devices represented by the icons 30a, 40a, and 34a/e/f are window blinds, a HVAC vent, and light fixtures/lamps, such as the window blinds 30A, HVAC system/vent 40, and light fixtures/lamps 34/34A of FIG. 1B, respectively. In particular, the icons 30a, 34a/e/f, 40a in the populated floorplan map 60 indicate the locations of the window blinds 30A and lights 34A in the Kitchen 606, the locations of the HVAC vent 40 and light in the Den 603, and the location of a light 34A in the Living Room 607. The wavy lines shown by icon 40a indicate the operating state of the HVAC vent 40 as "on" or "open," the solid pattern of the icons 34e indicate the operating states of the Kitchen 606 lights as "on," the speckled pattern of the icons 34a, 34f indicate the operating states of the Den 603 and Living Room 607 lights as "dimmed," and the separation between the triangular elements of icon 30a indicate the operating state of the window blinds as "open."

The floorplan map 60 further indicates an absence of walls or barriers (shown by dotted areas 61) between three rooms (the Living Room 607, the Kitchen 606, and the Den 603), defining a contiguous space 650. As noted above, the absence of walls/barriers may be indicated by the occupancy data detected by localizing sensors and/or by signal coverage data acquired by a wireless transceiver of a mobile robot responsive to navigation of the operating environment. That is, while a living space (and/or grouping of devices therein) may be defined by a user input as separate rooms (illustrated as a Living Room, 607 Kitchen 606, and Den 603), the actual floorplan 60 of the living space illustrated in FIG. 6 includes multiple, adjacent rooms that define a broader, contiguous space 650.

Based on the presence or absence of walls/barriers or other physical boundaries in the floorplan map, embodiments of the present disclosure may further identify a relative spatial context of areas/rooms in the operating environment, and may segment or group the electronic devices in the operating environment into subsets corresponding to the relative spatial context of the areas/rooms. In the example of FIG. 6, the window blinds, HVAC vent, and light fixtures represented by icons 30a, 34a/e/f, and 40a may be grouped into a common subset responsive to identification of their respective spatial locations as corresponding to a contiguous space 650, as well as into further respective subsets based on the rooms in which they are located (Living Room, 607 Kitchen 606, and Den 603). Embodiments of the present disclosure may thereby coordinate individual control of electronic devices based on the relative spatial context of the rooms in combination with the groups or subsets with which the electronic devices may be associated, rather than based only on artificial boundaries (defined by a user or otherwise) between the rooms in which the electronic devices are located.

For example, in providing motion-activated lighting responsive to detection of a presence of a user in the Kitchen 606, it may be desirable to also light the Living Room 607 and Den 603, as the three rooms are included in the contiguous space 650. However, a user-defined control scheme based on locations of the devices represented by icons 30a, 34a/e/f, 40a may be logically challenging, as a user-based definition of the space 650 one big room may reduce the granularity with which the connected devices can be controlled, while a user-based association of these devices with multiple, separate named rooms may not be logically coordinated based on room names. However, by identifying the relative spatial context of the rooms and the respective spatial locations of the devices, embodiments of the present disclosure can individually control the devices represented by icons 30a, 34a/e/f, 40a based on the contiguous space 650 in which they are located, while also allowing for control based on the individual rooms (Living Room, 607 Kitchen 606, Den 603) in which they are located.

In particular, responsive to detecting the presence of the user in the Kitchen 606 and the identification of the Living Room 607 and the Den 603 as being portions of the same contiguous space 650, control signals can be transmitted to turn on the lights in the Kitchen 606 (indicated by the solid patterns of icons 34e), and to turn on the lights in Living Room 607 and Den 603 at a lower level (indicated by the speckled patterns of icons 34a and 34e). In contrast, turning on only the Kitchen 606 lights responsive to detecting the presence of the user in the Kitchen 606 would leave the user staring into the dark Living Room 607 and Den 603 portions of the contiguous space 650. Such individual control of electronic devices based not only on their association with a contiguous space, but also based on the spatial context of the rooms in which the devices are located, may provide a more pleasing automated lighting experience.

In another example, if the window 30 in the Kitchen 606 is detected as being in the "open" state (indicated by separation between triangular blind elements in icon 30a), and if efficient HVAC operation is specified, then a control signal can be transmitted to the connected HVAC vent 40 in the Den 603 to switch its operating state from "open" (indicated by the wavy lines in icon 40a) to "closed," based on the spatial proximity of the location of the HVAC vent 40 to the location of open window 30, even though the HVAC vent 40 is located in a different room (in the Den 603, rather than in the Kitchen 606 where the window 30 is located). That is, control based on identification of the HVAC vent 40 and the open window 30 as being in the contiguous space 650 may be more advantageous than control based on only the spatial locations of the HVAC vent 40 and the window 30 in the separate rooms 603 and 606 of the operating environment.

Figure 7:
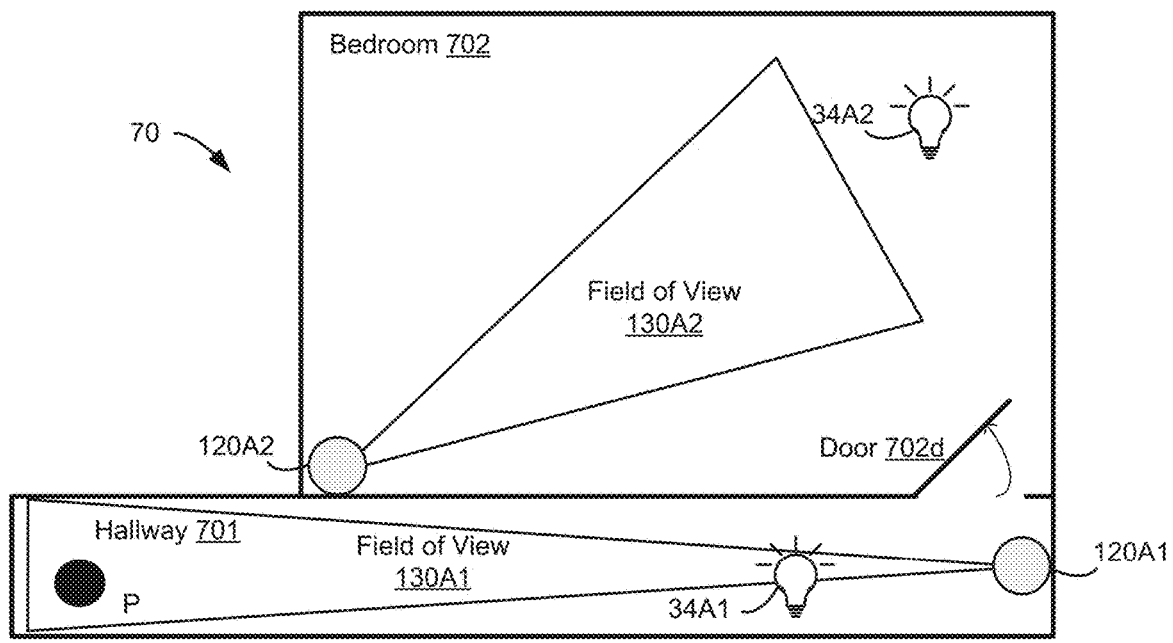
FIG. 7 is a plan view illustrating example operations for predictively controlling connected devices according to embodiments of the present disclosure.

Connected computing device(s) as described herein may further be configured to transmit control signals to control operation of one or more connected electronic devices predictively, based on device operation and/or environmental conditions in adjacent areas of the operating environment. For example, in controlling motion-activated events, such as lighting, it may be desirable to control operation of a connected electronic device before (or as) a user enters a space, rather than after detecting the presence of the user in the space. FIG. 7 is a plan view illustrating example operations for predictive control of a connected electronic device responsive to detecting a presence and/or trajectory of a user in an area of the operating environment proximate to the location of the connected electronic device, according to embodiments of the present disclosure.

As shown in FIG. 7, based on occupancy data collected by one or more localizing sensors of a mobile robot (such as the mobile robot 200) responsive to navigation of an operating environment (such as the living space 20), a relative spatial context of rooms 701, 702 in an operating environment 70 may be identified. For example, the data collected by the mobile robot may be put together to build or generate a plan view map of an interior space. In particular, FIG. 7 illustrates a relative spatial context of a Hallway 701 to a Bedroom 702 in the operating environment 70. In addition, based on the occupancy data and/or signal coverage data collected by the mobile robot, information received from a user via a user interface of a user terminal (such as the user terminals 142, 144, 400), and/or information received from one or more network nodes (such as nodes 110, 126, 127, 128, 200, 140, and 150 of FIG. 1A), electronic devices 34A1, 34A2, 120A1, 120A2 are associated with respective spatial locations in the operating environment 70. In particular, light 34A1 and motion sensor 120A1 are associated with respective locations in the Hallway 701, while light 34A2 and motion sensor 120A2 are associated with respective locations in the Bedroom 702.

In the example of FIG. 7, the operation of the lights 34A1 and 34A2 can be individually controlled based on their respective spatial locations, as well as the relative spatial context of the rooms 701 and 702 in which they are located. For example, in addition to turning on light 34A1 responsive to detection of the presence of a user P in the Hallway 701 within the field of view 130A1 of the motion sensor 120A1, embodiments described herein can predict which rooms the user P may be about to enter and take action proactively, based on the adjacency of spaces 701 and 702 indicated by the relative spatial context. In particular, as the Hallway 701 has been identified as being adjacent to the Bedroom 702, a control signal may be transmitted to turn on the light 34A2 in the Bedroom 702 responsive to the detection of the presence of the user P in the Hallway 701, prior to the user P entering the Bedroom 702 and being detected by the motion sensor 120A2 in the Bedroom. That is, the presence of the user P in the Bedroom 702 is predicted (and the connected device 34A2 in the Bedroom 702 is controlled accordingly) from the presence of the user P detected in the Hallway 701, based on the relative spatial location of the motion sensor 120A1 to the light 34A2, as well as the relative spatial context of the rooms 701, 702 indicated by the mobile robot occupancy data. In contrast, if the light 34A2 in the Bedroom 702 is not activated until the motion sensor 120A2 in Bedroom is triggered, the user P may have to walk many steps in the dark, particularly as the field of view 130A2 of the motion sensor 120A2 does not cover the door 702d to the Bedroom 702.

In some embodiments, the motion sensor 120A1 in the Hallway 701 may be further configured to detect a trajectory of the user P (either towards or away from the door 702d to the Bedroom 702), and the light 34A2 in the Bedroom may also be controlled based on the detected trajectory, rather than the detected presence alone. That is, if the motion sensor 120A1 detects the presence of the user P in the Hallway 701 and detects a trajectory of the user P towards the Bedroom door 702d, the control signal may be transmitted to activate the light 34A2 in the Bedroom 702. Conversely, if the motion sensor 120A1 detects the presence of the user P in the Hallway 701 but detects a trajectory of the user P that is not toward the Bedroom door 702d, the control signal to activate the light 34A2 in the Bedroom 702 may not be transmitted.

Furthermore, electronic devices may be individually controlled differently responsive to detecting the same event, based on their relative spatial locations and/or the relative spatial context of the rooms in which they are located. For example, in controlling lighting of adjacent spaces 701 and 702 in FIG. 7, the light 34A1 in the Hallway 701 (in which presence of the user P is directly detected by motion sensor 120A1) may be activated to a higher level of brightness than the light 34A2 in the Bedroom 702 in which presence of the user P is predicted. That is, as the user P walks down the Hallway 701 toward the Bedroom 702, the light 34A1 may be activated to provide brighter task lighting, while the light 34A2 in the adjacent Bedroom 702 may be activated to provide lower-level accent lighting. The light 34A2 may thereafter be activated to provide brighter task lighting responsive to detection of actual presence in the Bedroom 702 by motion sensor 120A2 (or predicted presence in the Bedroom 702 from proximity to motion sensor 120A1), and the light 34A1 may be dimmed or turned off. However, in some embodiments, the light 34A2 in the bedroom 702 may not be activated to the brighter state responsive to previous detection of the presence of another person (for example, a spouse or significant other) in the Bedroom 702 by the motion sensor 120A2, even if there is no further detection of motion (for example, if the spouse/significant other is sleeping). That is, previous detection by the motion sensor 120A2 may override subsequent control operations for the light 34A2 responsive to subsequent detection of the user P by the motion sensor 34A2. This control scheme may be reversed responsive to detection of the user P leaving the Bedroom 702. Such different control schemes for connected devices based on their relative spatial locations and/or the relative spatial context of the rooms in which they are located may be more intuitively specified via the user interfaces described herein, such as the user interface 510 of FIG. 5, based on the illustrated positions of the devices and the relative spatial context of the rooms in the operating environment.

Figure 8:
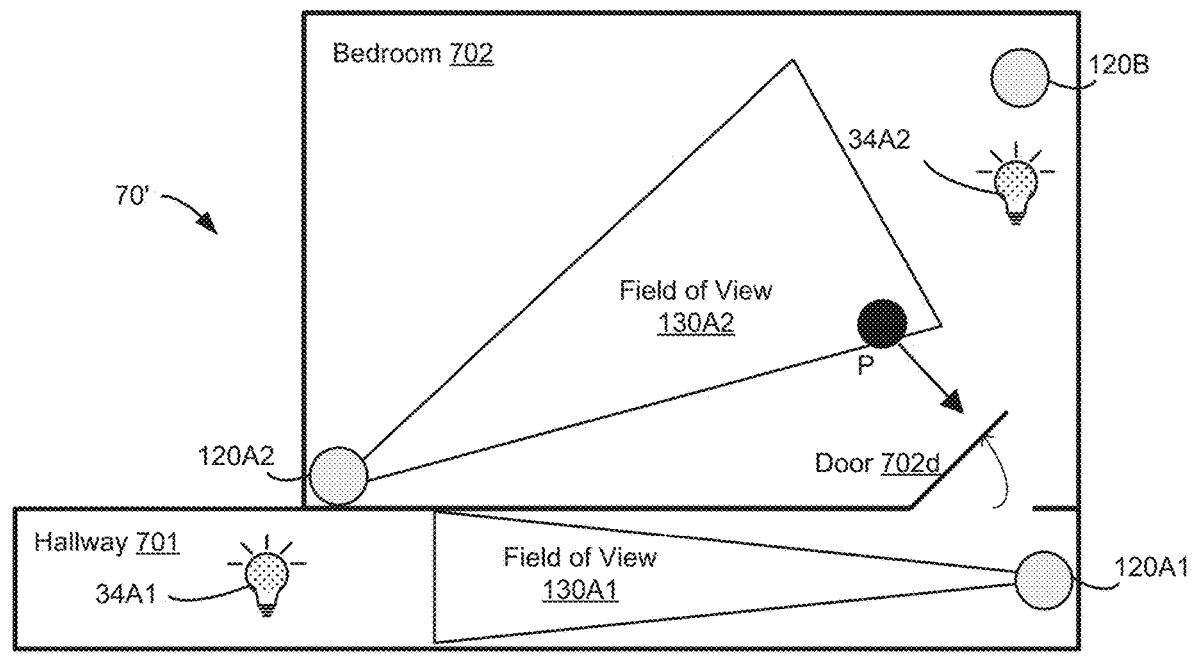
FIG. 8 is a plan view illustrating example operations for controlling connected devices based on the operational states of electronic devices in an adjacent space according to embodiments of the present disclosure.

Connected computing device(s) as described herein may further be configured to transmit control signals to control operation of one or more connected electronic devices based on the operational states of electronic devices in an adjacent space, and/or environmental conditions in an adjacent space. FIG. 8 is a plan view illustrating example operations for controlling connected devices based on conditions in an adjacent space according to embodiments of the present disclosure.

As shown in FIG. 8, based on occupancy data collected by one or more localizing sensors of a mobile robot (such as the mobile robot 200) responsive to navigation of an operating environment (such as the living space 20), a relative spatial context of rooms 701, 702 in an operating environment 70' may be identified. In particular, FIG. 8 illustrates a relative spatial context of a Hallway 701 to a Bedroom 702 in the operating environment 70'. In addition, based on the occupancy data and/or signal coverage data collected by the mobile robot, information received from a user via a user interface of a user terminal (such as the user terminals 142, 144 400), and/or information received from one or more network nodes (such as nodes 110, 126, 127, 128, 200, 140, and 150 of FIG. 1A), electronic devices 34A1, 34A2, 120A1, 120A2, 120B are associated with respective spatial locations in the operating environment 70'. In particular, light 34A1 and motion sensor 120A1 are associated with respective locations in the Hallway 701, while light 34A2, motion sensor 120A2, and luminance sensor 120B are associated with respective locations in the Bedroom 702.

In the example of FIG. 8, the operation of the lights 34A1 and 34A2 can be individually controlled based on their respective spatial locations in the rooms 701 and 702, the relative spatial context of the rooms 701 and 702 in which they are located, and also their respective operational states. For example, responsive to detecting motion of the user P in the Bedroom 702 and/or a trajectory of the user P towards the door 702d by the motion sensor 120A2, embodiments of the present disclosure may predict the presence of the user P in the Hallway 701, and may transmit a control signal to activate the light 34A1 in the Hallway 701 in response. In addition, embodiments of the present disclosure may further control the light 34A1 in the Hallway 701 based on the operating state of the light 34A2 in the Bedroom 702. In particular, as shown in FIG. 8, responsive to detection of low-level or dim light output from the light 34A2 in the Bedroom 702 (as reported by the light 34A2 itself or the luminance sensor 120B), a control signal may be transmitted to the light 34A1 in the Hallway to provide a similar low-level or dim light output, such that the user P will encounter consistent lighting when the user P arrives in the Hallway 701, to avoid blinding the user P. These operations may occur prior to detection of the presence of the user P in the Hallway 701 by motion sensor 120A1. That is, when a user P leaves a dark Bedroom 702 and enters a Hallway 701, the Hallway lights 34A1 may be controlled based on the operating state of the light 34A2 at the location from which the user P arrived. Conversely, when a user P leaves a brightly-lit area, the lighting in the adjacent space may be controlled to be comparably bright.

In addition, as the luminance sensor 120B in the Bedroom 720 may detect both artificial and natural lighting, the light 34A1 in the Hallway 701 may be controlled based on the light level detected by the operational state of the luminance sensor 120B in the adjacent space 702, separately or in addition to the operational state of the light 34A2. That is, the luminance sensor 120B may detect a high brightness level in the Bedroom 702 due to sunlight or other environmental lighting, and the light 34A1 in the windowless Hallway 701 may be controlled to provide a similar level of illumination based on the brightness level detected by the luminance sensor 120B. More generally, the connected devices located in one area of an operating environment may be controlled based on one or more detected conditions (as influenced by electronic device operation and/or the environment) from another area of the operating environment where a user is located. Knowledge of the layout of a home or other operating environment and the locations of connected sensors and devices and people can thereby provide a 'smarter' smart home experience.

Further operations and advantages in accordance with embodiments of the present disclosure may include automatic generation and/or tailoring of automated rules for controlling connected devices responsive to associating devices with respective spatial locations in the operating environment. For instance, in response to receiving a user input dragging-and-dropping a device on a location of a displayed floorplan map, one or more conditional instructions for operation of the device may be automatically generated based on the type of device, the type of room corresponding to or proximate the location, and/or the spatial context of the room relative to other rooms and/or devices in the operating environment. In one example, responsive to detecting a user input associating a motion sensor type device with a room on the map, conditional instructions may be automatically generated to turn lights on in that room when motion is detected. Likewise, responsive to detecting a user input associating a motion-based alarm sensor with a spatial location, conditional instructions may be automatically generated to deactivate the motion-based alarm sensor based on a scheduled time of operation of a mobile robot at the same spatial location.

In another example, responsive to determining a spatial location of a lighting device as being proximate to a natural light source (for example, a window), conditional instructions specifying operation of the lighting device based on expected or detected lighting conditions may be automatically generated. For instance, conditional instructions specifying that the lighting device should be turned off during daytime hours (based on the expected natural light during daytime hours) or turned on based on insufficient light from the natural light source (as detected by a luminance detector) may be automatically generated. The conditions may further include seasonal and/or weather-related conditions (for instance, the daytime hours corresponding to the expected natural light may vary based on season and/or weather).

In still another example, responsive to detecting that lighting devices in a Bedroom are off, a control signal to turn on the lighting devices in the Bedroom may not be transmitted responsive to detecting motion in an adjacent Hallway. The room type may be determined by receiving user input of a room name, or may be automatically detected based on visual recognition of objects in the room and/or identification of electronic devices in the room. That is, conditional instructions for operating an electronic device may be automatically created based on the association of the device with a spatial location, and the device may be operated responsive to on occurrence of one or more conditions (including time-, seasonal-, temperature-, and/or weather-based conditions) indicated by the conditional instructions.

Conditional instructions for operating the electronic devices may also be automatically adjusted based on detection of the presence of one or more users or mobile robots in the operating environment, and/or based on their positions in the relative spatial context. For instance, in the above example of the lighting device proximate the natural light source, the threshold for sufficiency of light from the natural light source (and thus, the occurrence of the condition triggering the activation of the lighting device) may vary based on the presence of a user or a camera-based mobile robot, which may require greater lighting needs. A schedule associated with the mobile robot in this example may also be used to determine presence and adjust the conditional instructions; for instance, if the mobile robot is scheduled to clean at the spatial location of the lighting device proximate the natural lighting source at a particular time of day, and if the season and/or weather indicates that the natural lighting provided by the natural lighting source at the scheduled time of day is insufficient for the camera-based imaging of the mobile robot, the lighting device may be activated. More generally, the conditional instructions for operating an electronic device may be automatically generated based not only of the association of the device with a spatial location, but also on any combination of conditions that may be detected or expected to occur at the spatial location.

In addition, embodiments of the present disclosure may further control operation of electronic devices in the operating environment to verify the consistency and/or accuracy of the occupancy data. For example, during navigation of an operating environment, a mobile robot (such as the mobile robot 200) may activate connected lights to their "on" and "off" states in order to visually recognize the spatial locations of the connected lights in the environment and add the spatial locations of the lights to the occupancy data. This updated occupancy data may be compared with previously-collected occupancy data to resolve ambiguities and/or update changes to the environment in a corresponding floorplan map. In addition, the mobile robot may selectively activate connected lighting devices and build a "light map" for each lighting device, to determine the respective illumination impact on the space of each lighting device. This light map may allow for selective control of particular lighting devices so to achieve a desired lighting level and coverage. Such operations for selectively activating connected devices and/or comparing activation with previous results may also be performed by one or more other network elements in the operating environment.

Also, embodiments of the present disclosure are not limited to representing spatial locations and status information for connected devices in the operating environment. For example, some embodiments can provide temporal status information based on device energy monitoring, even for non-connected devices that are local to the operating environment. In particular, energy usage of a non-connected device can be determined using networked energy monitoring devices, such as the Sense home energy monitor, which automatically detects and identifies non-connected devices based on their power draw profile. For example, an air conditioning unit and a refrigerator in the operating environment can be uniquely identified based on their respective energy usage and power draw profiles. Operating status information and respective spatial locations for such non-connected devices may also be determined from energy usage and corresponding locations of power outlets. Spatial locations of such non-connected devices can further be visually recognized by a mobile robot during navigation of the operating environment. Thus, non-connected devices can be identified, added to the floorplan map to indicate their respective spatial locations, and correlated with their energy usage information to provide visual indications of location and status in the operating environment as described herein.

Figure 9:
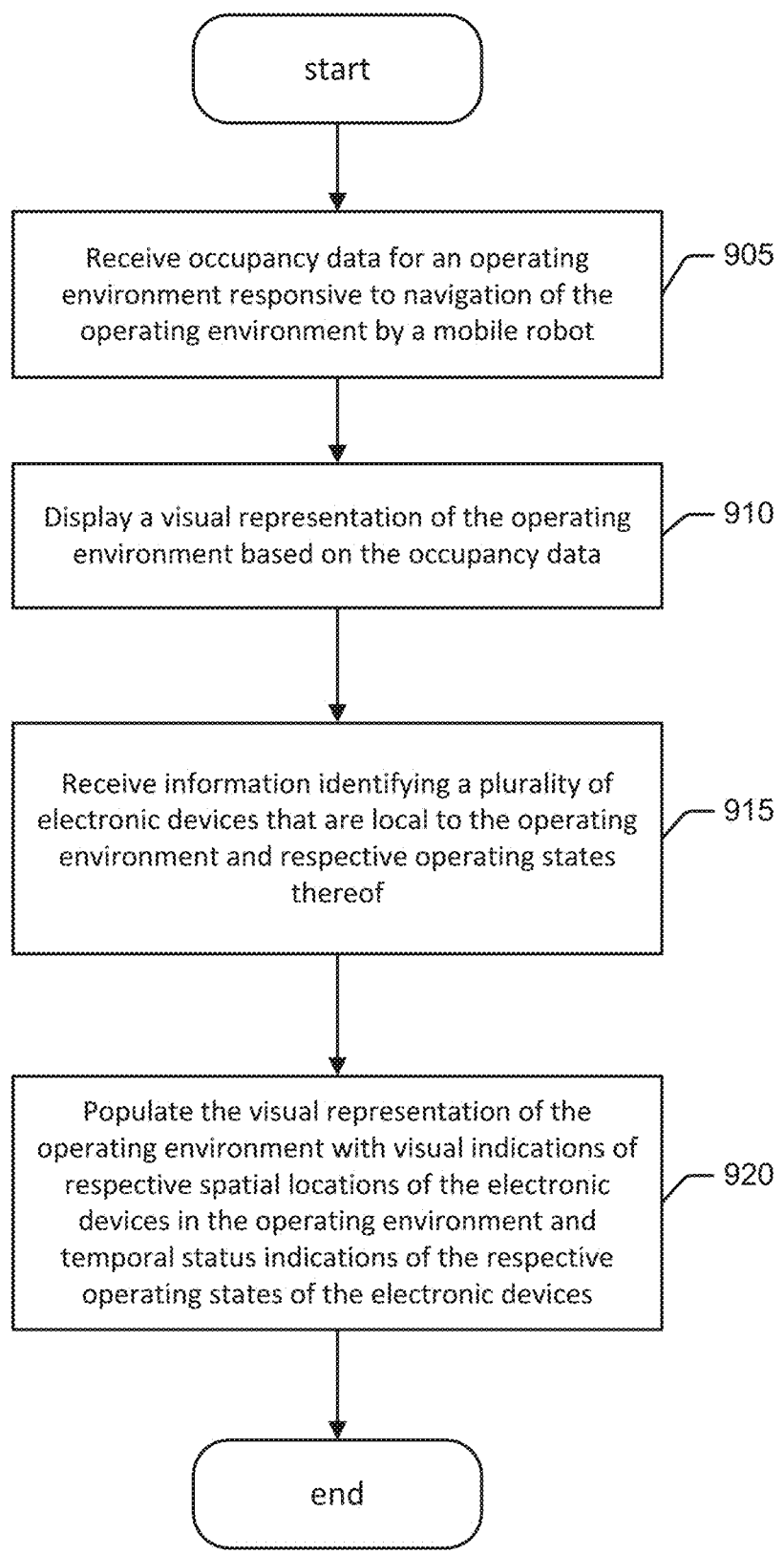
FIG. 9 is a flowchart illustrating operations that may be performed by or responsive to instructions from at least one processor of a user terminal according to embodiments of the present disclosure.
Figure 10:
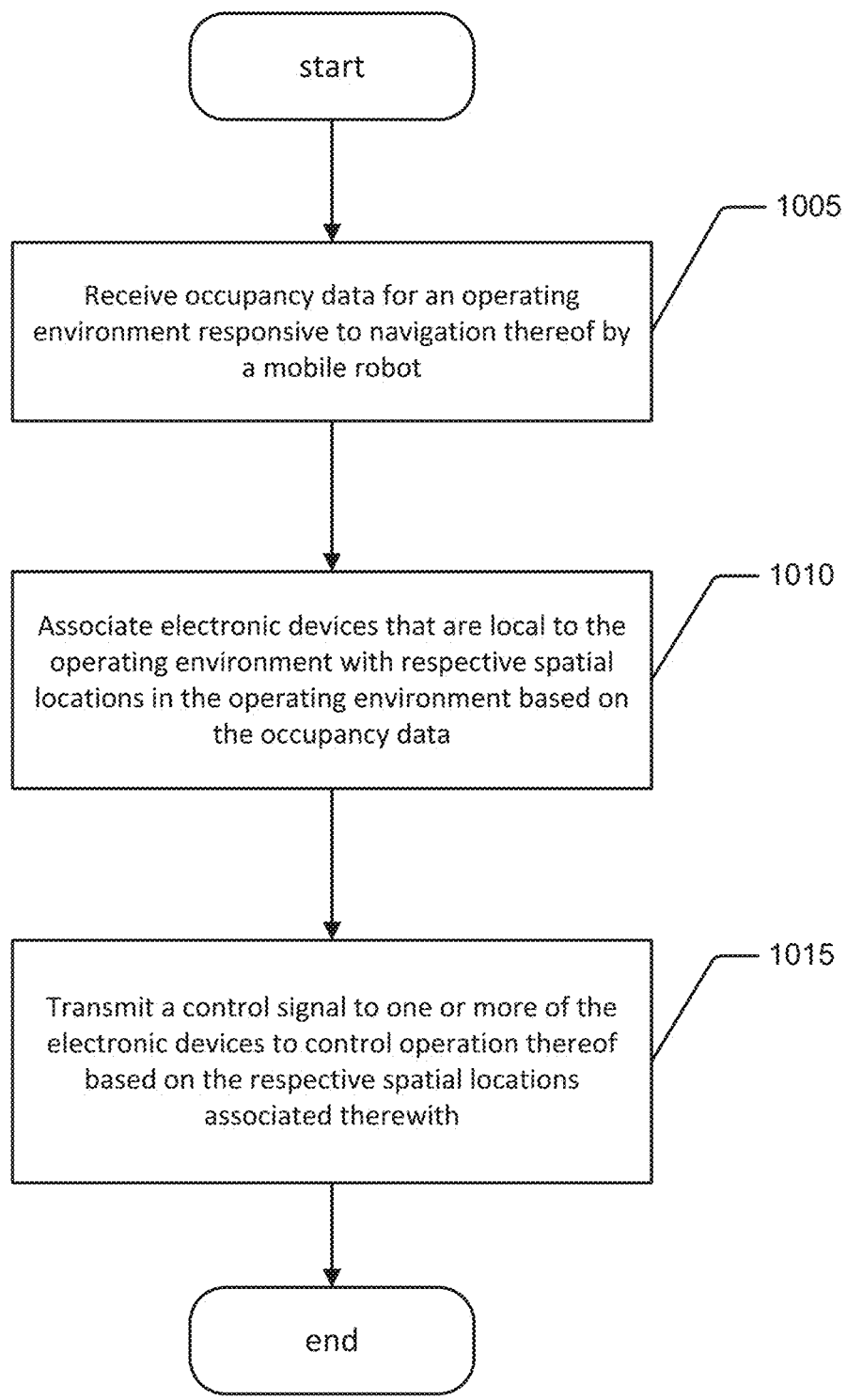
FIG. 10 is a flowchart illustrating operations that may be performed by at least one processor of a computing device according to embodiments of the present disclosure.

FIGS. 9-10 are flowcharts illustrating operations that may be performed by or responsive to instructions from at least one processor of a computing device in accordance with embodiments of the present disclosure. The operations of FIGS. 9-10 may represent executable routines or instructions stored in a non-transitory computer-readable medium, such as the memory devices 222, 320, 428 described herein, and may be executed by one or more processors, such as the processors 220, 310, and/or 427 described herein, to implement the specified routines or instructions.

FIG. 9 is a flowchart illustrating operations that may be performed by a user terminal according to embodiments of the present disclosure. In particular, the operations of FIG. 9 may be executed by or responsive to instructions from one or more processors of a user terminal, such as the user terminals 142, 144, 400 described herein. With reference to FIG. 9, occupancy data for an operating environment is received at block 905 responsive to navigation of the operating environment by a mobile robot. The occupancy data may be generated based on localization data detected by one or more localizing sensors of the mobile robot responsive to navigation in the operating environment, and may be received via one or more receivers of the user terminal. The localization data may include range measurements from ranging sensors, occupancy and obstacle determinations from obstacle and proximity sensors, and feature and landmark determinations from cameras and other pattern/image/fiducial observation sensors. The localization data may be detected in a surface mapping routine to record 2-dimensional occupancy data representing locations of the operating environment and/or poses of the mobile robot thereon, for example, using VSLAM techniques. A visual representation of the operating environment is generated based on the occupancy data and displayed via a user interface of the user terminal at block 910. More particularly, in response to receiving the occupancy data, one or more processors of the user terminal may generate and transmit instructions to operate the user interface to display a plan view map of the operating environment, such as the floorplan map 50 of FIGS. 4-5.

Information identifying electronic devices in the operating environment and respective operating states of the electronic devices is received at block 915. The information identifying the electronic devices and/or the information identifying their respective operating states may be received from (or otherwise determined from data provided by) one or more network elements in the operating environment (for example, based on information collected by the hub 110, sensors 120, and/or controllers 126, 127, 128), the mobile robot (for example, based on occupancy data or wireless signal coverage data collected thereby during navigation of the operating environment), and/or the user interface of the user terminal (for example, based on inputs adding the icons 30a, 34a-34f, 40a to the list 420).

The visual representation of the operating environment is thereby populated with visual indications of respective spatial locations of the electronic devices, as well as status indications of their respective operating states at block 920. For example, based on the information identifying the electronic devices and their respective operating states, the displayed plan view map of the operating environment (such as the floorplan map 50 of FIGS. 4-5) may be populated with icons that graphically represent the respective electronic devices (such as icons 30a, 34a-34f, 40a). The icons may be displayed at spatial locations on the plan view map that correspond to the actual locations of the electronic devices in the operating environment. The spatial locations may be determined from the occupancy data and/or wireless signal coverage data collected by the mobile robot responsive to navigation of the operating environment, and/or from user input received via the user interface (for example, dragging-and-dropping the icons 30a, 34a-34f, 40a shown in the list 420 into the map 50).

In some embodiments, the icons themselves may further graphically indicate the respective operating states of the electronic devices represented by the icons. For example, as shown then the user interface 510 of FIG. 5, the floorplan map 50 is populated with light bulb icons 34a-34e representing connected lighting devices in the operating environment, a vent icon 40a representing a connected HVAC vent in the operating environment, and a window icon 30a representing connected window blinds the operating environment. Symbols and/or shading of the light bulb icons 34a-34e, wavy lines of the vent icon 40a, and extension of blind elements across an entirely of the window icon 30a indicate the respective operating states of the devices represented by the icons 34a-34e, 40a, and 30a.

FIG. 10 is a flowchart illustrating operations that may be performed by a computing device according to embodiments of the present disclosure. In particular, the operations of FIG. 10 may be executed by or responsive to instructions from one or more processors of a network-enabled computing device, such as (but not limited to) the hub 110, controllers 126, 127, 128, mobile robot 200, dock 140, user terminals 142, terminal 144, 400 server 150, and/or computing device 300. With reference to FIG. 10, occupancy data for an operating environment is received at block 1005 responsive to navigation of the operating environment by a mobile robot. The occupancy data may be generated based on localization data detected by one or more localizing sensors of the mobile robot, for instance, using VSLAM techniques, as described above with reference to block 905 of FIG. 9. In some embodiments, the occupancy data may be received via one or more network receivers of the computing device.

Electronic devices in the operating environment are associated with respective spatial locations of the operating environment based on the occupancy data at block 1010. As noted above, the spatial locations of the electronic devices may be determined from the occupancy data and/or from wireless signal coverage data collected by the mobile robot responsive to navigation of the operating environment, and/or from user input received via the user interface. In addition, the occupancy data may be indicative of rooms in the operating environment, for example, based on an absence or presence of physical boundaries between the areas of the operating environment encountered by the mobile robot during navigation. A relevant spatial context of the rooms in the operating environment may be further identified based on the occupancy data, and electronic devices may thereby be segmented or grouped into respective subsets based on the respective spatial locations thereof in light of the relative spatial context of the rooms in the operating environment. For example, electronic devices in/near a same room, or within/near boundaries of contiguous rooms, may be grouped into the same subset, while electronic devices outside of the boundaries of a room or of contiguous rooms may be grouped into a different subset.

A control signal is transmitted to one or more of the electronic devices to control operation thereof based on their respective spatial locations (and/or based on the relative spatial context of the rooms corresponding to the respective spatial locations) at block 1015. For instance, control signals may be transmitted to one or more of the electronic devices according to their corresponding grouping or subsets in a common room or contiguous space. In one example, in responsive to receiving a user input selecting (e.g., by clicking on or tapping a portion of a displayed plan view map of rooms) or otherwise indicating a particular room, respective control signals may be generated and transmitted to activate (for example, dim) lighting devices located in the particular room, based on their common grouping. In another example, lighting devices spatially located in contiguous areas of an operating environment may be similarly controlled based on their grouping in a common subset, despite being physically located in different rooms. Also, the control signal may be transmitted to one or more electronic devices based on the type of room corresponding to their respective spatial locations, and/or device activity and/or environmental conditions in an area of the operating environment adjacent their respective spatial locations.

That is, as described herein, electronic devices may be differently controlled based on their respective spatial locations in the operating environment, the relative spatial context of the rooms corresponding to their respective spatial locations, and/or operating conditions in adjacent areas of the operating environment (including operating states of other electronic devices and/or environmental conditions). Data indicating the actual operation of electronic devices may also be logged and stored in a database along with data indicating expected or scheduled operation of the electronic devices, for use in generating and displaying temporal status information whereby the operating status for the electronic devices can be presented at user-selectable points in time. Thus, based on occupancy data collected by a mobile robot during navigation of an operating environment, a user interface may be generated that provides a visual representation of device locations and past/present/future operating states of the devices, and also allows for control of current or future operating states of the electronic devices.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a hard disk drive, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any non-transitory medium that can contain, or store a program for use by or in connection with an instruction execution system, apparatus, or device.

A computer readable signal medium may include a propagated data signal with computer readable information embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable information embodied on a computer readable signal medium (for example, as program code) may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. The program code may execute entirely on a user terminal, a mobile robot, or a remote server described herein, or partly on one or more of each. In the latter scenario, the remote server may be connected to the user terminal and/or to the mobile robot through any type of network, including a local area network (LAN) or a wide area network (WAN), or the connection may be made to an external computer (for example, through the Internet using an Internet Service Provider) and/or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions The foregoing is illustrative of embodiments of the present disclosure and is not to be construed as limiting thereof. Although a few example embodiments have been described, those skilled in the art will readily appreciate that many modifications are possible in the example embodiments without materially departing from the teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A method of operating a user terminal, comprising:
performing, by or responsive to instructions from at least one processor of the user terminal, operations comprising:
receiving, via at least one receiver of the user terminal, occupancy data for an operating environment responsive to navigation of the operating environment by a mobile robot, the occupancy data including contiguity information corresponding to physically undivided but artificially separated areas in the operating environment;
displaying, via a user interface of the user terminal, a visual representation of the operating environment based on the occupancy data;
receiving, via the at least one receiver of the user terminal, information identifying a plurality of electronic devices, including lighting-related devices, that are local to the operating environment and respective spatial locations and operating states thereof;
automatically grouping, via a processor, two or more of the physically undivided but artificially separated areas each associated with at least one of the electronic devices into a contiguous space in a subset of the operating environment based on the received contiguity information and the respective spatial locations of the electronic devices;
populating the visual representation of the operating environment with visual indications of the respective spatial locations of the electronic devices in the operating environment and status indications of the respective operating states of the electronic devices;
automatically generating conditional instructions to control operation of the lighting-related devices in the grouped contiguous space based on the respective spatial locations thereof; and
providing a control signal to the mobile robot to clean an area in the grouped contiguous space in accordance with the controlled operation of the lighting-related devices.

2. The method of claim 1, further comprising:
receiving, via the user interface, an input specifying a time,
wherein the respective operating states are associated with temporal data corresponding to the time specified by the input.

3. The method of claim 2, further comprising:
displaying, via the user interface, a user interface element visually representing a temporal range comprising past, present, and future times, wherein the input specifying the time is received responsive to manipulation of the user interface element.

4. The method of claim 3, wherein the user interface element comprises a bar element representing the temporal range and a slider element that is displayed at respective positions along the bar element responsive to the manipulation.

5. The method of claim 2, wherein the temporal data comprises past, present or future temporal data, and wherein the respective operating states comprise actual operating states associated with the past or present temporal data or expected operating states associated with the future temporal data.

6. The method of claim 5, wherein the status indications identify conflicts between the expected operating states of two or more of the electronic devices based on the respective spatial locations thereof.

7. The method of claim 5, wherein the input specifying the time comprises a temporal range, and further comprising:
displaying, via the user interface, a representation of the actual and/or expected operating states of one or more of the electronic devices over the temporal range specified by the input.

8. The method of claim 1, wherein the information identifying the plurality of electronic devices comprises localization data detected by one or more localizing sensors of the mobile robot, wireless communication signal coverage data acquired by one or more wireless receivers of the mobile robot, network data detected by one or more network elements, and/or user selection data received via the user interface of the user terminal.

9. The method of claim 1, wherein populating the visual representation of the operating environment comprises:
determining the respective spatial locations of the electronic devices in the operating environment based on localization data detected by at least one localization sensor of the mobile robot and/or wireless communication signals acquired by at least one wireless receiver of the mobile robot responsive to navigation thereof in the operating environment.

10. The method of claim 1, wherein the visual indications comprise respective icons for the electronic devices, and wherein the status indications comprise graphical characteristics of the respective icons.

11. The method of claim 1, wherein the mobile robot is a camera-based cleaning robot, and wherein the conditional instructions specify activation of the lighting devices based on a proximity of the respective spatial locations thereof to a natural light source in the operating environment and an expected or detected amount of light provided by the natural light source.

12. The method of claim 1, wherein the one or more of the electronic devices comprises a motion-based alarm sensor, and wherein the conditional instructions specify deactivation of the motion-based alarm sensor based on a scheduled time of operation of a mobile robot at the respective spatial location of the motion-based alarm sensor.

13. The method of claim 1, further comprising segmenting or grouping the electronic devices local to the grouped contiguous space into subsets corresponding to the contiguous space.

14. The method of claim 13, further comprising generating conditional instructions to control operations of the electronic devices based on the segmentation or grouping of the electronic devices.

15. A user terminal, comprising:
at least one receiver;
a user interface;
a processor coupled to the at least one receiver and the user interface; and
a memory coupled to the processor, the memory comprising a non-transitory computer-readable storage medium storing computer-readable program code therein that is executable by the processor to perform operations comprising:
receiving, via the at least one receiver, occupancy data for an operating environment responsive to navigation of the operating environment by a mobile robot, the occupancy data including contiguity information corresponding to physically undivided but artificially separated areas in the operating environment;
displaying, via the user interface, a visual representation of the operating environment based on the occupancy data;
receiving, via the at least one receiver, information identifying a plurality of electronic devices, including lighting-related devices, that are local to the operating environment and respective spatial locations and operating states thereof;
automatically grouping two or more of the physically undivided but artificially separated areas each associated with at least one of the electronic devices into a contiguous space in a subset of the operating environment based on the received contiguity information and the respective spatial locations of the electronic devices;
populating the visual representation of the operating environment with visual indications of the respective spatial locations of the electronic devices in the operating environment and status indications of the respective operating states of the electronic devices;
automatically generating conditional instructions to control operation of the lighting-related devices in the grouped contiguous space based on the respective spatial locations thereof; and
providing a control signal to the mobile robot to clean an area in the grouped contiguous space in accordance with the controlled operation of the lighting-related devices.

16. The user terminal of claim 15, wherein the operations further comprise:
receiving, via the user interface, an input specifying a time,
wherein the respective operating states are associated with temporal data corresponding to the time specified by the input.

17. The user terminal of claim 16, wherein the operations further comprise:
displaying, via the user interface, a user interface element visually representing a temporal range comprising past, present, and future times,
wherein the input specifying the time is received responsive to manipulation of the user interface element.

18. The user terminal of claim 17, wherein the user interface element comprises a bar element representing the temporal range and a slider element that is displayed at respective positions along the bar element responsive to the manipulation.

19. The user terminal of claim 16, wherein the temporal data comprises past, present or future temporal data, and wherein the respective operating states comprise actual operating states associated with the past or present temporal data or expected operating states associated with the future temporal data.

20. The user terminal of claim 19, wherein the status indications identify conflicts between the expected operating states of two or more of the electronic devices based on the respective spatial locations thereof.

21. The user terminal of claim 19, wherein the input specifying the time comprises a temporal range, and wherein the operations further comprise:

displaying, via the user interface, a representation of the actual and/or expected operating states of one or more of the electronic devices over the temporal range specified by the user.

* * * * *